US010310226B2

(12) United States Patent
Li

(10) Patent No.: US 10,310,226 B2
(45) Date of Patent: Jun. 4, 2019

(54) CAMERA LENS

(71) Applicant: ZHEJIANG SUNNY OPTICS CO., LTD., Ningbo, Zhejiang (CN)

(72) Inventor: Ming Li, Zhejiang (CN)

(73) Assignee: ZHEJIANG SUNNY OPTICS CO., LTD., Ningbo, Zhejiang (CN)

( * ) Notice: Subject to any disclaimer, the term of this patent is extended or adjusted under 35 U.S.C. 154(b) by 0 days.

(21) Appl. No.: 15/569,294

(22) PCT Filed: Sep. 21, 2016

(86) PCT No.: PCT/CN2016/099626
§ 371 (c)(1),
(2) Date: Oct. 25, 2017

(87) PCT Pub. No.: WO2018/045607
PCT Pub. Date: Mar. 15, 2018

(65) Prior Publication Data
US 2018/0314036 A1 Nov. 1, 2018

(30) Foreign Application Priority Data

Sep. 6, 2016 (CN) .......................... 2016 1 0807672

(51) Int. Cl.
*G02B 3/00* (2006.01)
*G02B 13/00* (2006.01)
(Continued)

(52) U.S. Cl.
CPC ....... *G02B 13/0045* (2013.01); *G02B 3/0062* (2013.01); *G02B 9/64* (2013.01); *G02B 13/04* (2013.01); *G02B 13/18* (2013.01)

(58) Field of Classification Search
CPC .... G02B 13/0045; G02B 3/0062; G02B 9/64; G02B 13/18
(Continued)

(56) References Cited

U.S. PATENT DOCUMENTS 9,488,804 B2 11/2016 Bone et al.
9,547,155 B2 1/2017 Liao
(Continued)

FOREIGN PATENT DOCUMENTS

CN 104345434 A 2/2015
CN 104749748 A 7/2015
(Continued)

OTHER PUBLICATIONS

International Search Report and Written Opinion dated Jun. 7, 2017 for corresponding International Application No. PCT/CN2016/099626, filed Sep. 21, 2016.
(Continued)

*Primary Examiner* — James R Greece
(74) *Attorney, Agent, or Firm* — David D. Brush; Westman, Champlin & Koehler, P.A.

(57) ABSTRACT

A camera lens includes, in sequence from an object side to an image side: a first lens having a negative refractive power; a second lens having a refractive power; a third lens having a positive refractive power, an image-side surface of the third lens being a concave surface; a fourth lens having a refractive power; a fifth lens having a refractive power; a sixth lens having a refractive power; and a seventh lens having a refractive power, an object-side surface and an image-side surface of the seventh lens each being an aspheric surface. The camera lens satisfies a conditional expression: $-2<f1/f<-1.4$, in which, f1 denotes an effective focal length of the first lens and f denotes an effective focal length of the camera lens.

13 Claims, 12 Drawing Sheets

(51) Int. Cl.
*G02B 9/64* (2006.01)
*G02B 13/18* (2006.01)
*G02B 13/04* (2006.01)

(58) Field of Classification Search
USPC .......................................................... 359/708
See application file for complete search history.

(56) References Cited

U.S. PATENT DOCUMENTS 9,606,329 B2    3/2017  Asami
2016/0109687 A1*  4/2016  Son .................... G02B 13/0045
                                                              348/294

FOREIGN PATENT DOCUMENTS

| CN | 104898258 A | 9/2015 |
| CN | 105445914 A | 3/2016 |
| CN | 105676422 A | 6/2016 |
| CN | 105911677 A | 8/2016 |

OTHER PUBLICATIONS

English translation of the International Search Report dated Jun. 7, 2017 for corresponding International Application No. PCT/CN2016/099626, filed Sep. 21, 2016.
English Translation of Written Opinion by the International Searching Authority dated Jun. 7, 2017 for corresponding International Application No. PCT/CN2016/099626, filed Sep. 21, 2016.

* cited by examiner

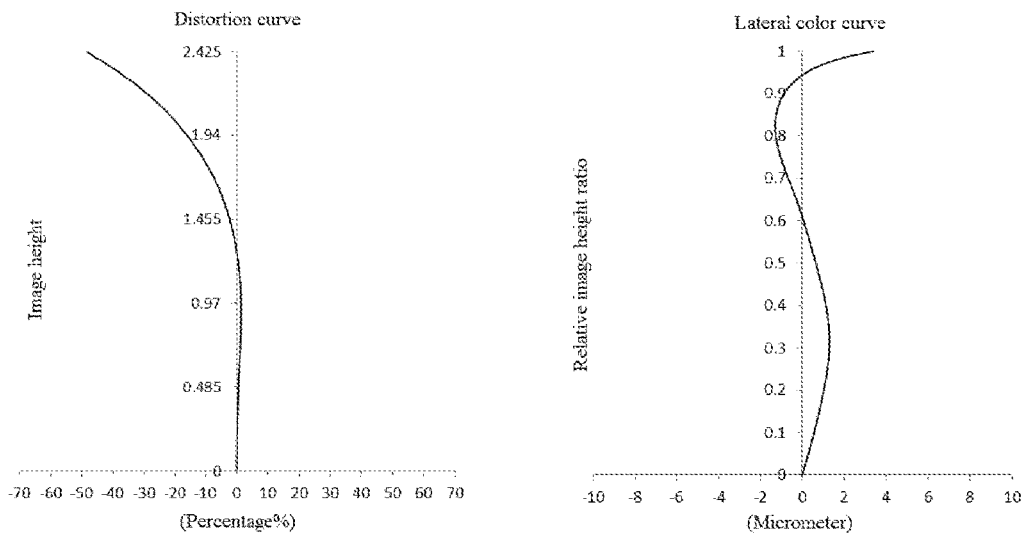
Fig. 24
Fig. 25
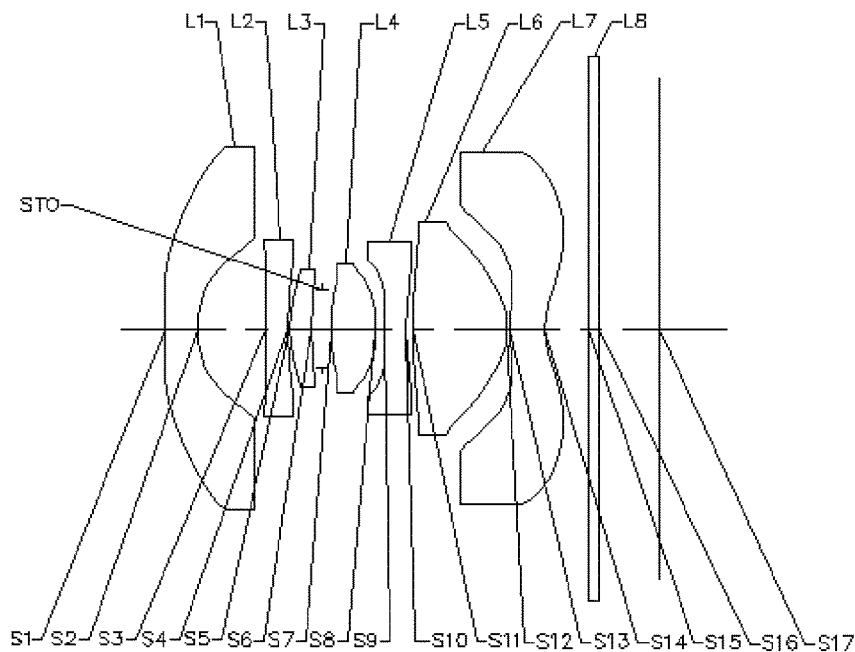
Fig. 26

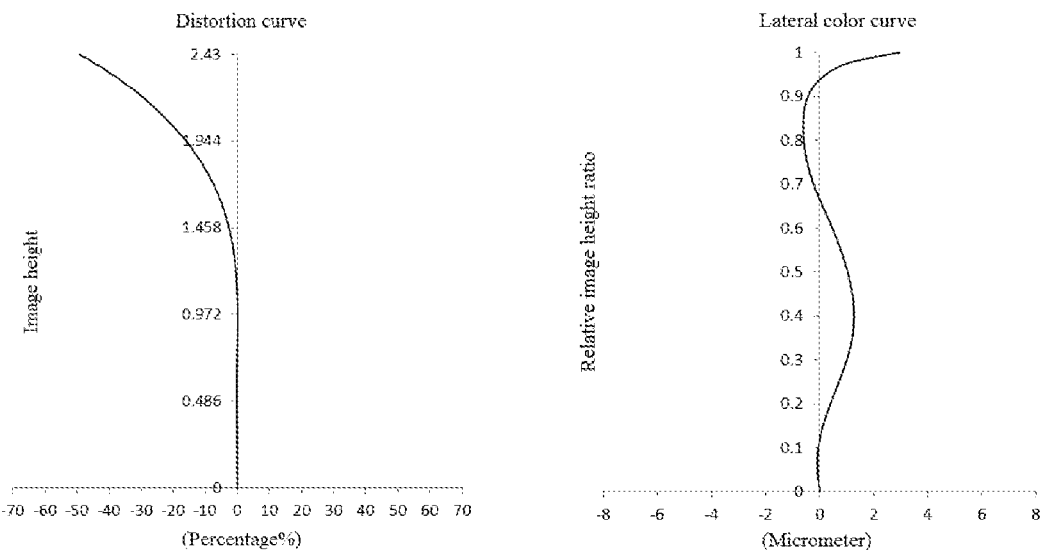
Fig. 34
Fig. 35
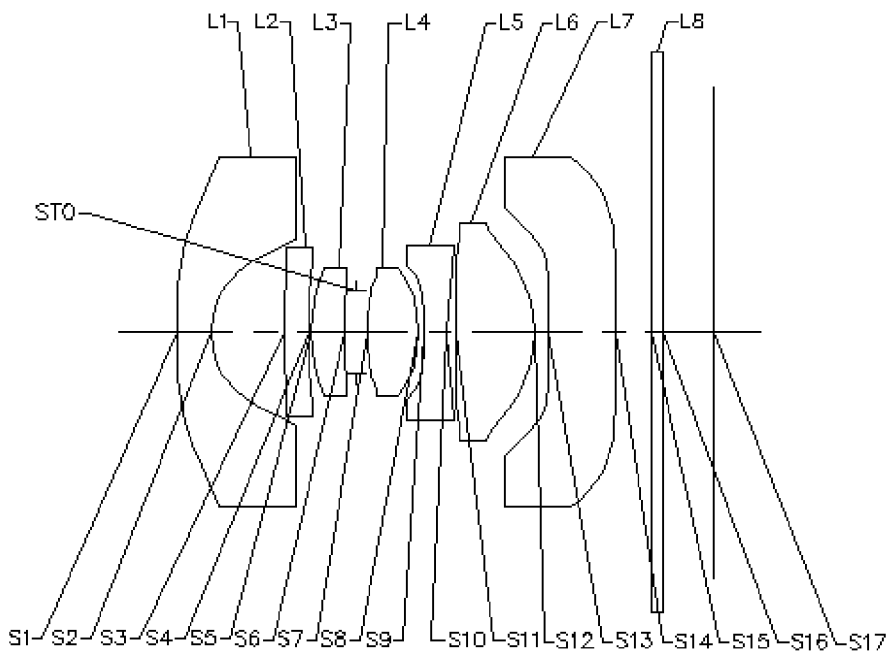
Fig. 36

CAMERA LENS

CROSS-REFERENCE TO RELATED APPLICATIONS

This Application is a Section 371 National Stage Application of International Application No. PCT/CN2016/099626, not yet published, which is based on and claims priority to and benefit of Chinese Patent Application Serial No. 201610807672.2, filed with the State Intellectual Property Office of P. R. China on Sep. 6, 2016, the contents of which are incorporated herein by reference in their entireties.

FIELD

The present disclosure relates to a field of optical imaging, and more particularly to a camera lens.

BACKGROUND

With developments of science and technology, portable electronic products spring up step by step, and especially the portable electronic product with a camera function is more popular with people. Generally, a photosensitive element in an optical system includes a charge coupled device (CCD) or a complementary metal oxide semiconductor (CMOS). With the development of semiconductor process technology, a pixel size of the photosensitive element is reduced, and the optical system tends to have a higher resolution and a higher imaging quality. To satisfy these tendencies, a camera lens applied to a camera device such as a cellphone, a digital camera, an automobile and a monitor is further required to be miniaturized and to have a high resolution and a wide angle.

US Patent No. US20160109687A1 provides an optical system. The optical system adopts a seven-lens camera lens structure, which has a relative sufficient field angle while ensuring miniaturization and a light weight, can correct aberration of the system and acquire a higher resolution. However the filed angle of the camera lens is less than 100 degrees, so there is still room for further optimization in the wide angle feature, and the resolution of the camera lens is dissatisfactory yet and does not satisfy higher requirements of markets for the camera lens.

SUMMARY

Embodiments of the present disclosure seek to solve at least one of problems existing in the related art to at least some extent. For that reason, a camera lens is provided by the present disclosure.

The camera lens according to embodiments of the present disclosure, in sequence from an object side to an image side, includes:
  a first lens having a negative refractive power;
  a second lens having a refractive power;
  a third lens having a positive refractive power, an image-side surface of the third lens being a concave surface;
  a fourth lens having a refractive power;
  a fifth lens having a refractive power;
  a sixth lens having a refractive power; and
  a seventh lens having a refractive power, an object-side surface and an image-side surface the seventh lens each being an aspheric surface, in which, the camera lens satisfies a conditional expression: $-2<f1/f<-1.4$, in which, f1 denotes an effective focal length of the first lens and f denotes an effective focal length of the camera lens.

In some embodiments, an object-side surface of the third lens is a convex surface.

In some embodiments, the fourth lens has a positive refractive power, an object-side surface of the fourth lens is a convex surface and an image-side surface of the fourth lens is a convex surface.

In some embodiments, the camera lens satisfies a conditional expression: $0.5<R5/R7<1$, in which, R5 denotes a radius of curvature of the object-side surface of the third lens, and R7 denotes a radius of curvature of the object-side surface of the fourth lens.

In some embodiments, the fifth lens has a negative refractive power, an object-side surface of the fifth lens is a convex surface and an image-side surface of the fifth lens is a concave surface, in which the camera lens satisfies a conditional expression: $-4.1<f5/f<-3.5$, in which, f5 denotes an effective focal length of the fifth lens, and f denotes the effective focal length of the camera lens.

In some embodiments, the sixth lens has a positive refractive power, an image-side surface of the sixth lens is a convex surface.

In some embodiments, the camera lens satisfies a conditional expression: $1.7<ImgH/f<2$, in which, ImgH denotes a half of a diagonal line of an effective pixel area on an imaging surface, and f denotes the effective focal length of the camera lens.

In some embodiments, the camera lens satisfies a conditional expression: $0.18<\Sigma T/TTL<0.45$, in which, $\Sigma T$ denotes a sum of axial spacing distance between any two adjacent lenses of the first lens, the second lens, the third lens, the fourth lens, the fifth lens, the sixth lens and the seventh lens, and TTL denotes an axial distance between an object-side surface of the first lens and an imaging surface.

In some embodiments, the camera lens satisfies a conditional expression: $0.95<CT2/CT5<1.5$, in which, CT2 denotes a center thickness of the second lens on an optical axis, and CT5 denotes a center thickness of the fifth lens on the optical axis.

In some embodiments, the camera lens satisfies a conditional expression: $0.18<(CT3+CT6)/TTL<0.5$, in which, CT3 denotes a center thickness of the third lens on the optical axis, CT6 denotes a center thickness of the sixth lens on the optical axis, and TTL denotes the axial distance between an object-side surface of the first lens and the imaging surface.

In some embodiments, the camera lens satisfies a conditional expression: $-1.6<SAG71/CT7<-1$, in which, SAG71 denotes an axial distance from an intersection point between the object-side surface of the seventh lens and an optical axis to a vertex of an effective radius of the object-side surface of the first lens, and CT7 denotes a center thickness of the seventh lens in an optical axis.

In some embodiments, the camera lens satisfies a conditional expression: $0.9<DT11/DT72<1.2$, in which, DT11 denotes an effective radius of the object-side surface of the first lens, and DT72 denotes an effective radius of the image-side of the seventh lens.

In some embodiments, the camera lens satisfies a conditional expression: $0.8<DT21/DT52<1.1$, in which, DT21 denotes an effective radius of an object-side surface of the second lens, and DT52 denotes an effective radius of the image-side surface of the fifth lens.

The camera lens according to embodiments of the present disclosure may effectively correct various high-order aberrations, thereby making a distortion less and a relative illumination higher, moreover the camera lens may has smaller size while improving resolution, and can be applied at different work environment.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and/or other aspects and advantages of embodiments of the present disclosure will become apparent and readily appreciated from descriptions made with reference to following drawings, in which:

FIG. 24 is a diagram showing a distortion curve (%) of the camera lens in embodiment 5;

FIG. 25 is a diagram showing a lateral color curve (μm) of the camera lens in embodiment 5;

FIG. 26 is a schematic view of a camera lens according to embodiment 6;

FIG. 34 is a diagram showing a distortion curve (%) of the camera lens in embodiment 7;

FIG. 35 is a diagram showing a lateral color curve (μm) of the camera lens in embodiment 7;

FIG. 36 is a schematic view of a camera lens according to embodiment 8;

DETAILED DESCRIPTION

Figure 1:
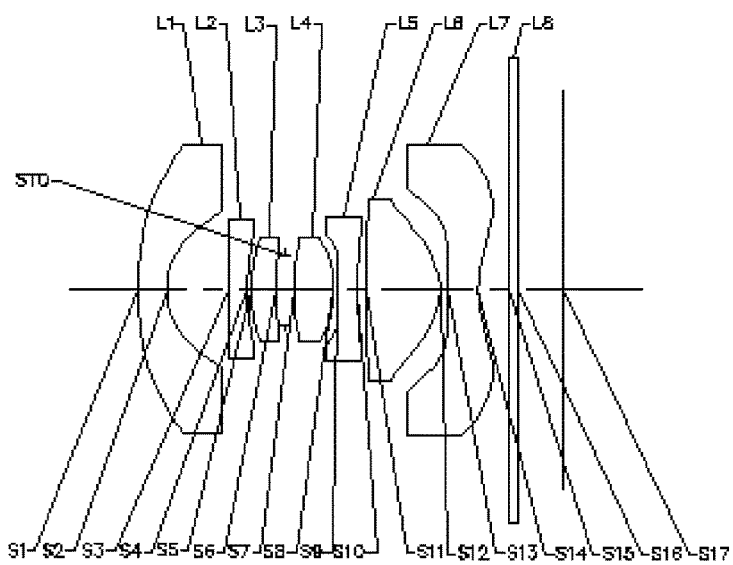
FIG. 1 is a schematic view of a camera lens according to embodiment 1.
Figure 2:
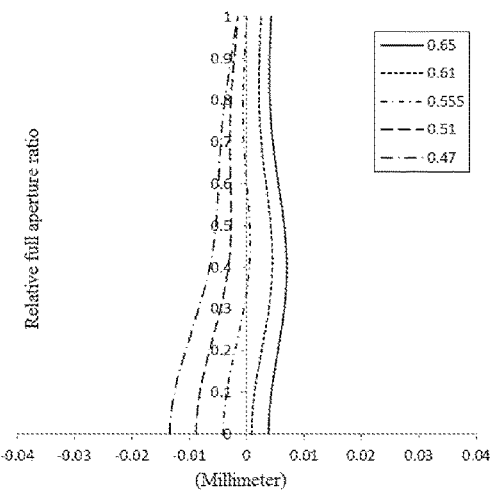
FIG. 2 is diagram showing a longitudinal aberration curve (mm) of the camera lens in embodiment 1.
Figure 3:
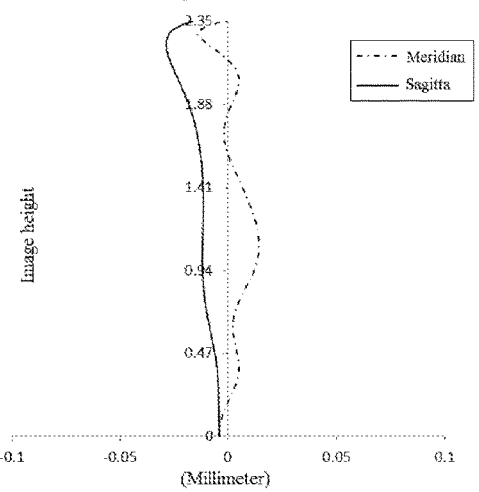
FIG. 3 is a diagram showing an astigmatism curve (mm) of the camera lens in embodiment 1.
Figure 4:
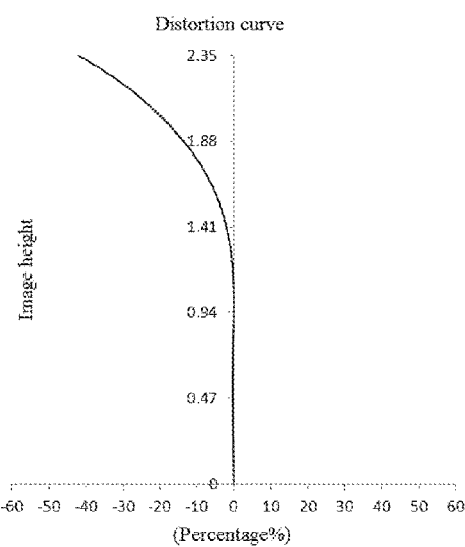
FIG. 4 is a diagram showing a distortion curve (%) of the camera lens in embodiment 1.
Figure 5:
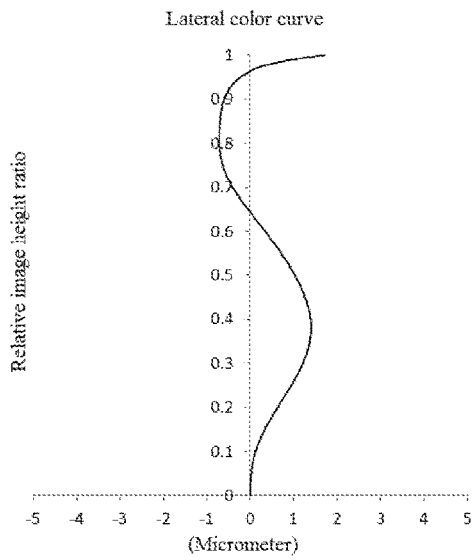
FIG. 5 is a diagram showing a lateral color curve (μm) of the camera lens in embodiment 1.
Figure 6:
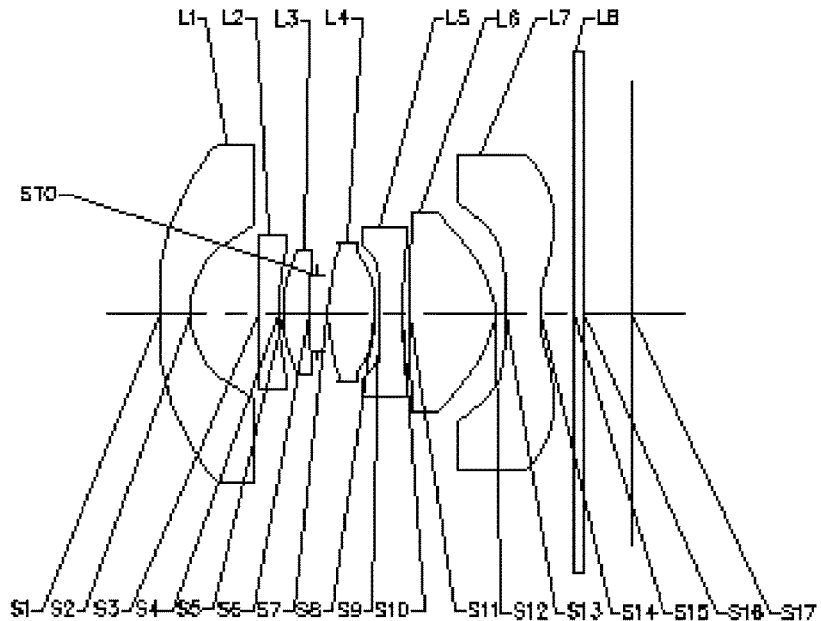
FIG. 6 is a schematic view of a camera lens according to embodiment 2.
Figure 7:
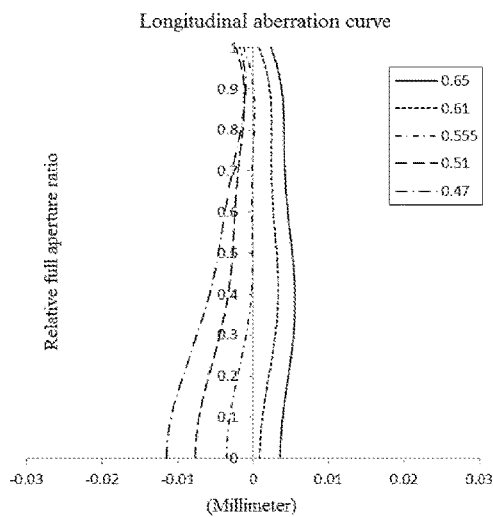
FIG. 7 is a diagram showing a longitudinal aberration curve (mm) of the camera lens in embodiment 2.
Figure 8:
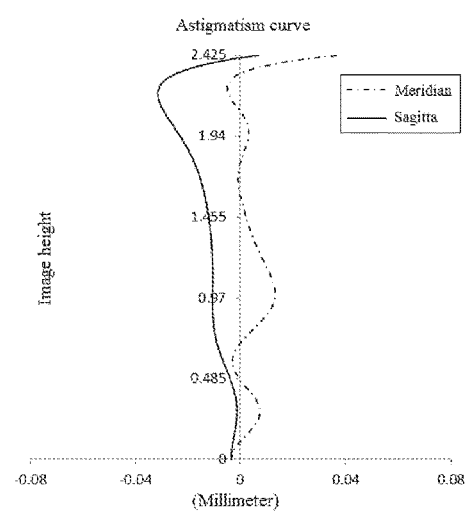
FIG. 8 is a diagram showing an astigmatism curve (mm) of the camera lens in embodiment 2.
Figure 9:
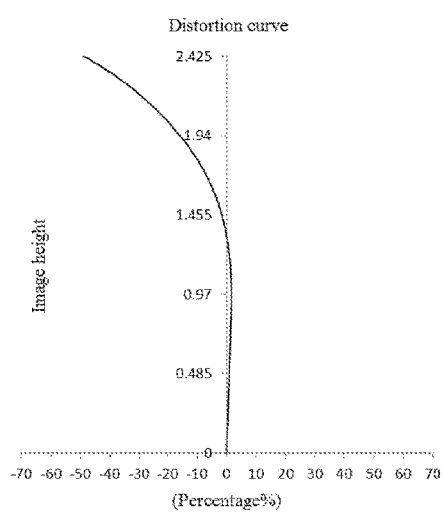
FIG. 9 is a diagram showing a distortion curve (%) of the camera lens in embodiment 2.
Figure 10:
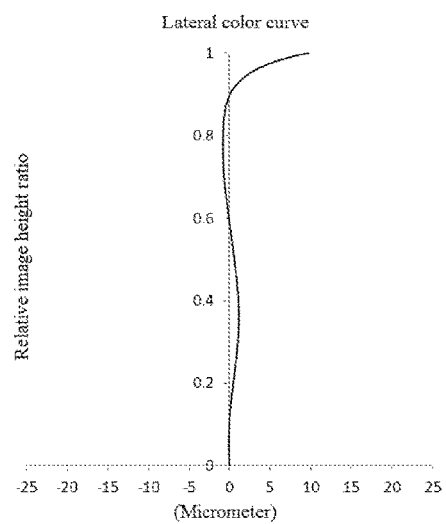
FIG. 10 is a diagram showing a lateral color curve (μm) of the camera lens in embodiment 2.
Figure 11:
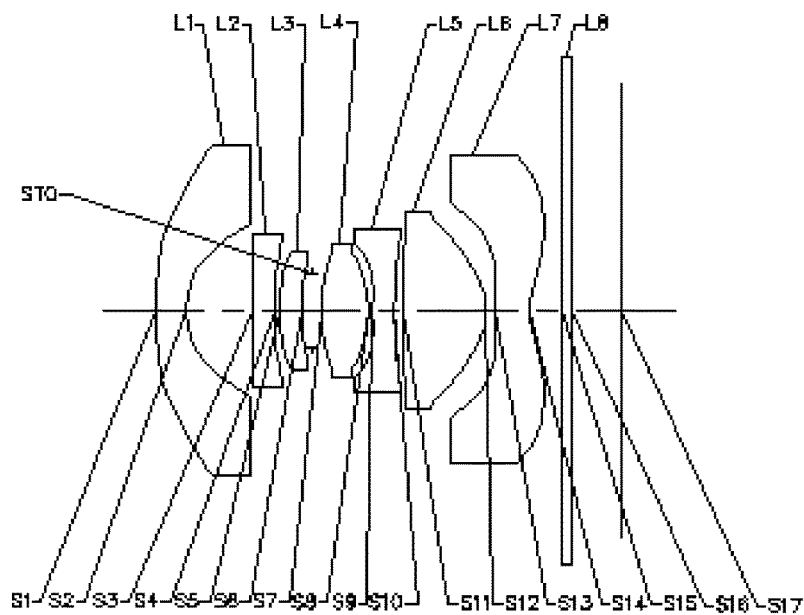
FIG. 11 is a schematic view of a camera lens according to embodiment 3.
Figure 12:
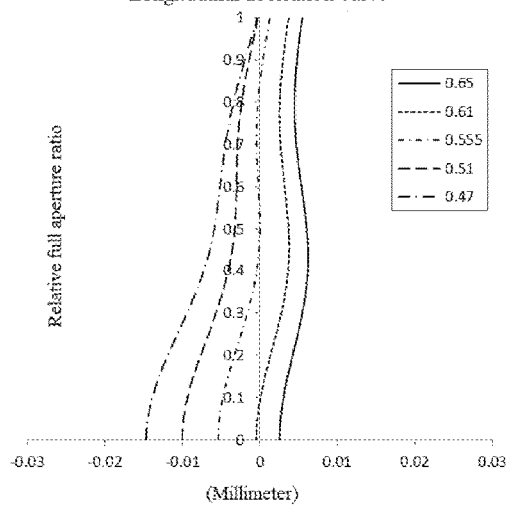
FIG. 12 is a diagram showing a longitudinal aberration curve (mm) of the camera lens in embodiment 3.
Figure 13:
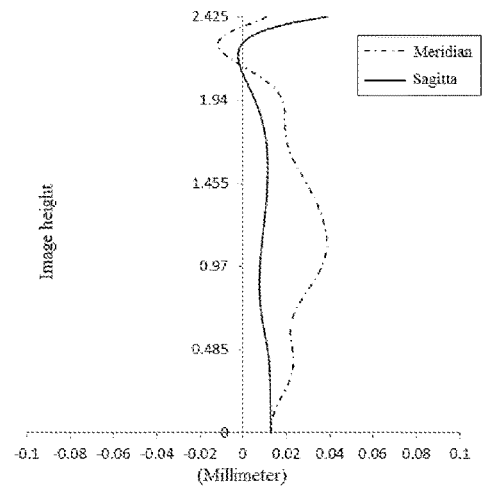
FIG. 13 is a diagram showing an astigmatism curve (mm) of the camera lens in embodiment 3.
Figures 14, 15:
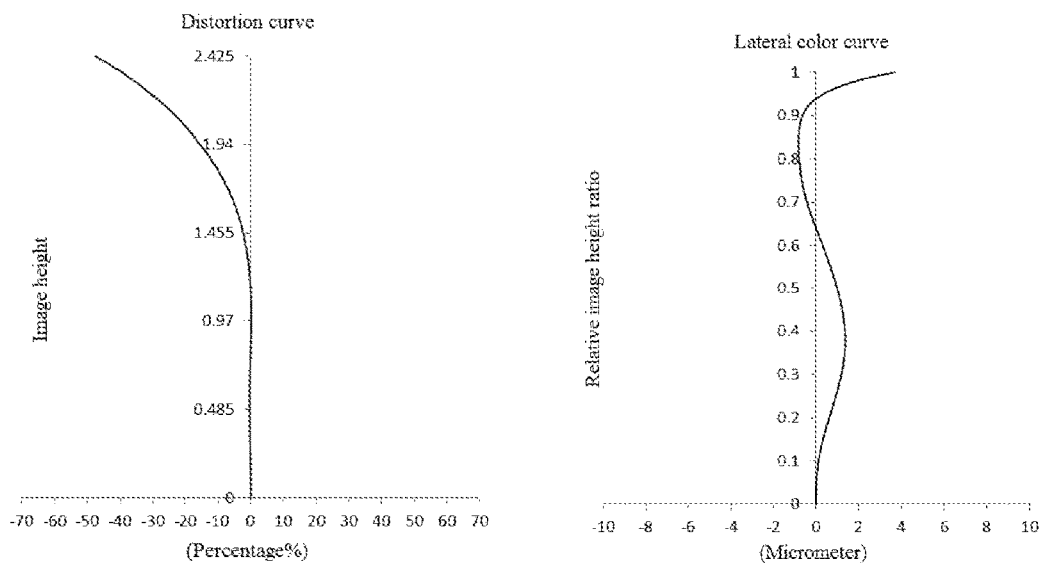
FIG. 14 is a diagram showing a distortion curve (%) of the camera lens in embodiment 3.
FIG. 15 is a diagram showing a lateral color curve (μm) of the camera lens in embodiment 3.
Figure 16:
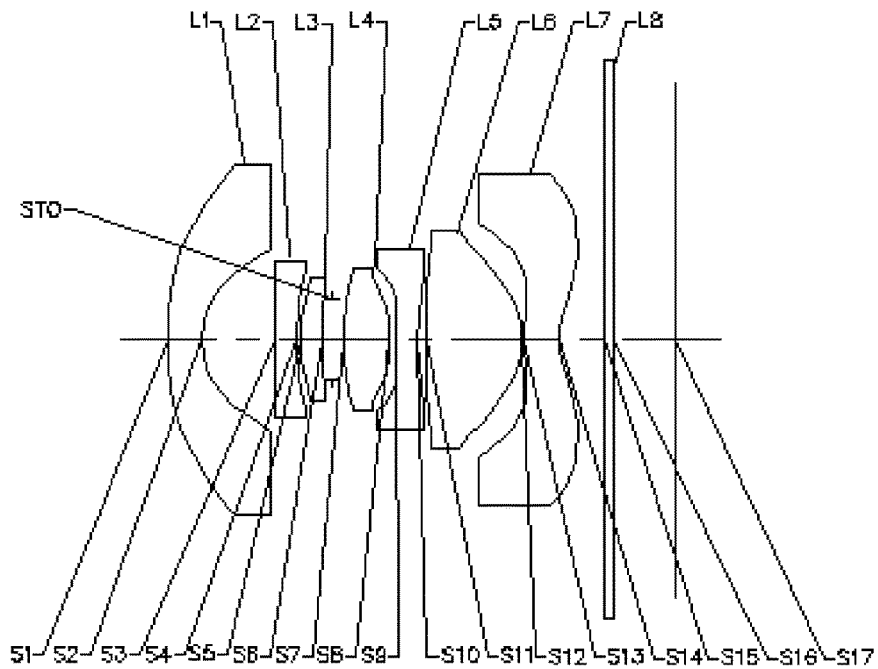
FIG. 16 is a schematic view of a camera lens according to embodiment 4.
Figure 17:
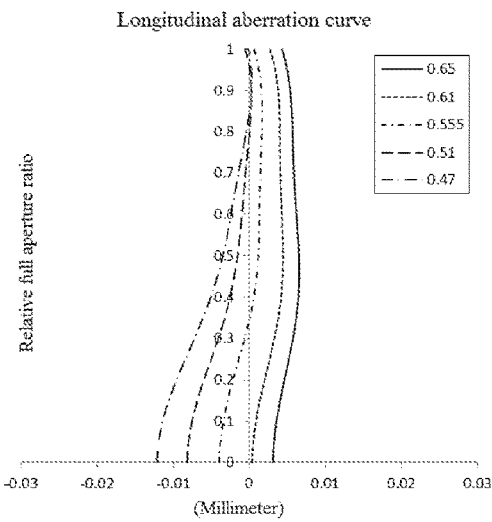
FIG. 17 is a diagram showing a longitudinal aberration curve (mm) of the camera lens in embodiment 4.
Figure 18:
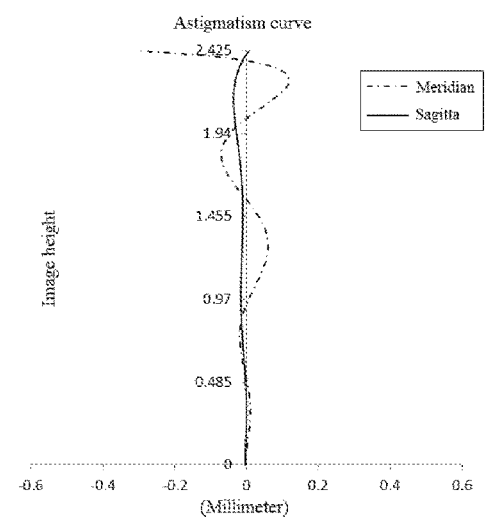
FIG. 18 is a diagram showing an astigmatism curve (mm) of the camera lens in embodiment 4.
Figure 19:
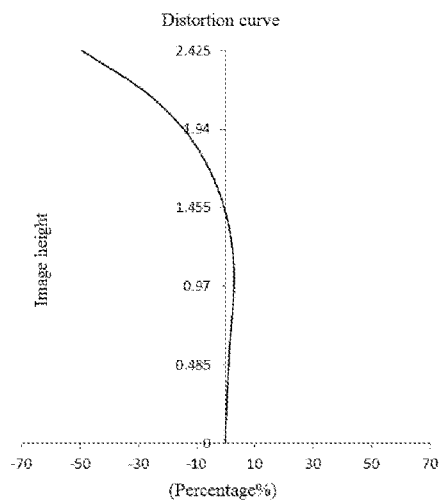
FIG. 19 is a diagram showing a distortion curve (%) of the camera lens in embodiment 4.
Figure 20:
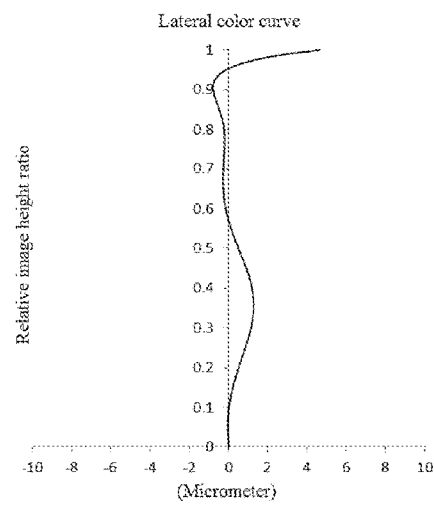
FIG. 20 is a diagram showing a lateral color curve (μm) of the camera lens in embodiment 4.
Figure 21:
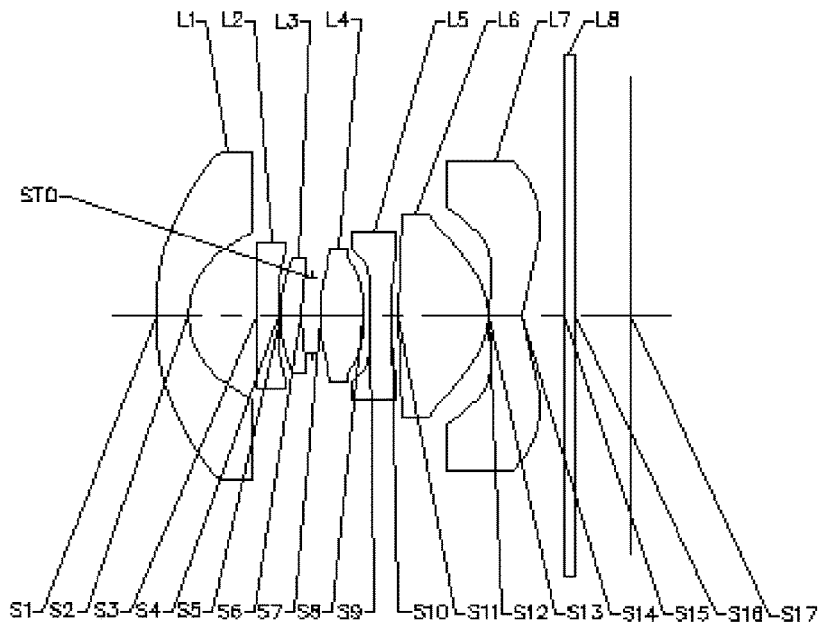
FIG. 21 is a schematic view of a camera lens according to embodiment 5.
Figure 22:
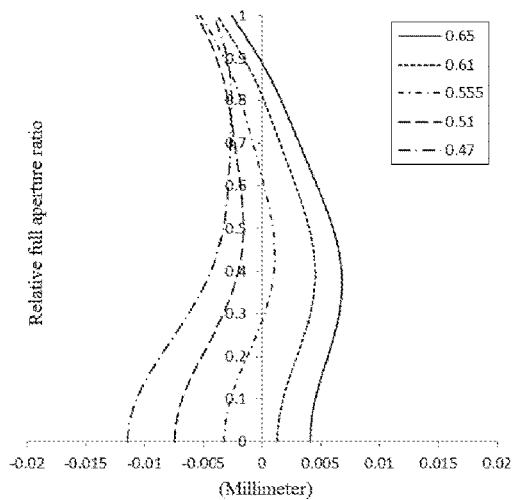
FIG. 22 is a diagram showing a longitudinal aberration curve (mm) of the camera lens in embodiment 5.
Figure 23:
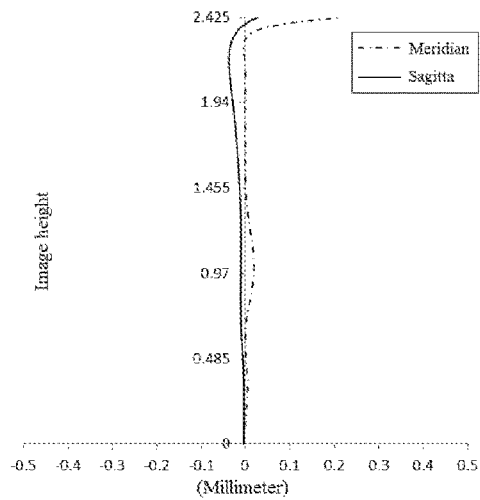
FIG. 23 is a diagram showing an astigmatism curve (mm) of the camera lens in embodiment 5.
Figure 27:
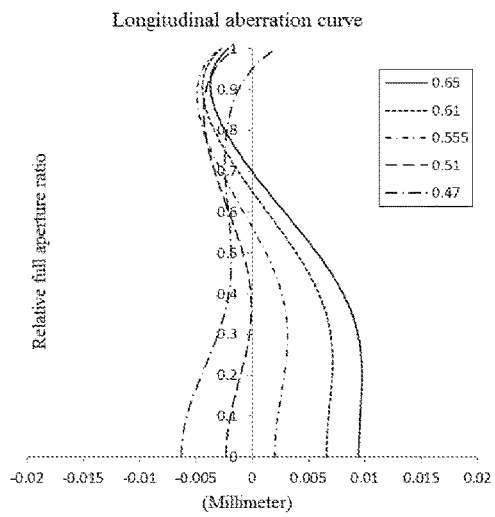
FIG. 27 is a diagram showing a longitudinal aberration curve (mm) of the camera lens in embodiment 6.
Figure 28:
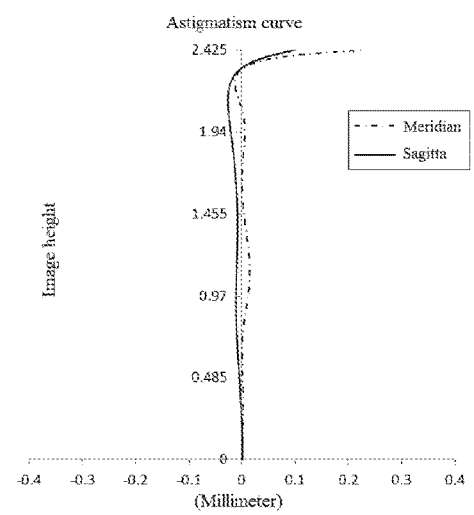
FIG. 28 is a diagram showing an astigmatism curve (mm) of the camera lens in embodiment 6.
Figure 29:
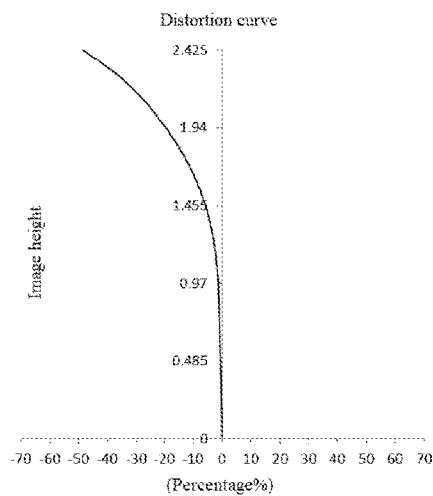
FIG. 29 is a diagram showing a distortion curve (%) of the camera lens in embodiment 6.
Figure 30:
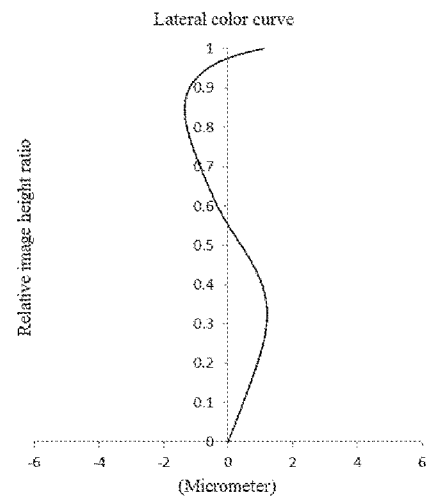
FIG. 30 is a diagram showing a lateral color curve (μm) of the camera lens in embodiment 6.
Figure 31:
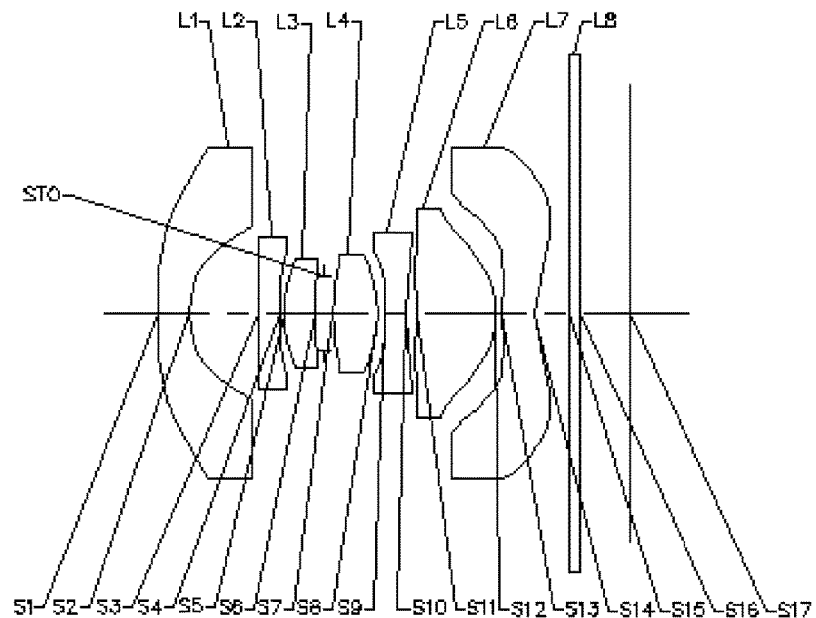
FIG. 31 is a schematic view of a camera lens according to embodiment 7.
Figure 32:
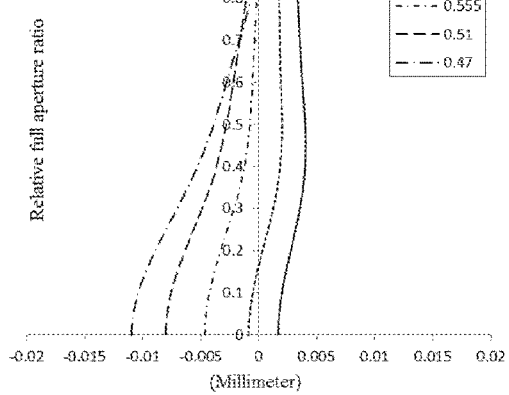
FIG. 32 is a diagram showing a longitudinal aberration curve (mm) of the camera lens in embodiment 7.
Figure 33:
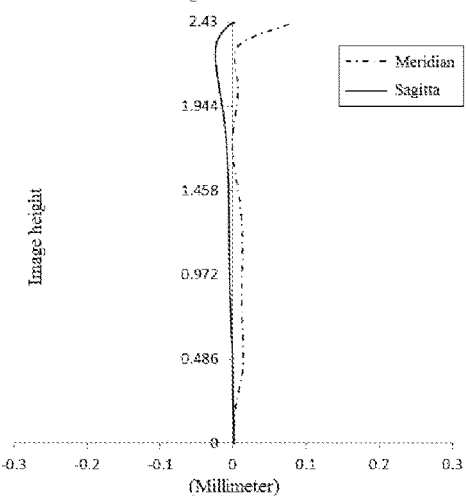
FIG. 33 is a diagram showing an astigmatism curve (mm) of the camera lens in embodiment 7.
Figure 37:
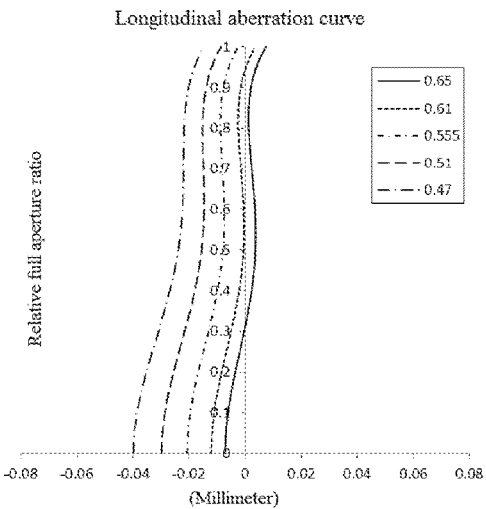
FIG. 37 is a diagram showing a longitudinal aberration curve (mm) of the camera lens in embodiment 8.
Figure 38:
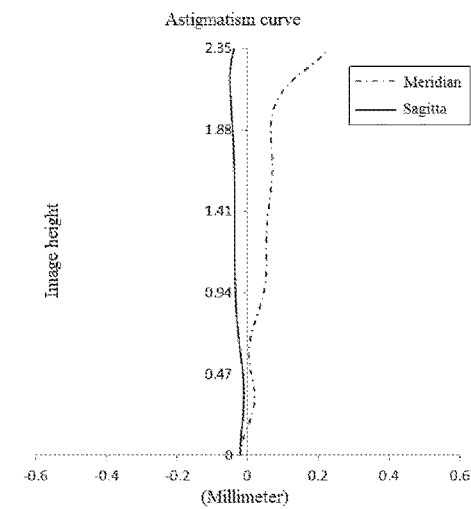
FIG. 38 is a diagram showing an astigmatism curve (mm) of the camera lens in embodiment 8.
Figure 39:
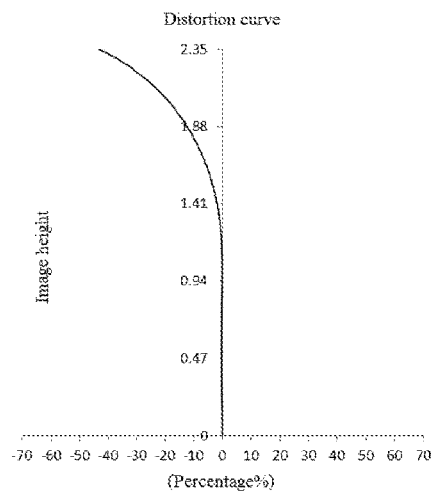
FIG. 39 is a diagram showing a distortion curve (%) of the camera lens in embodiment 8.
Figure 40:
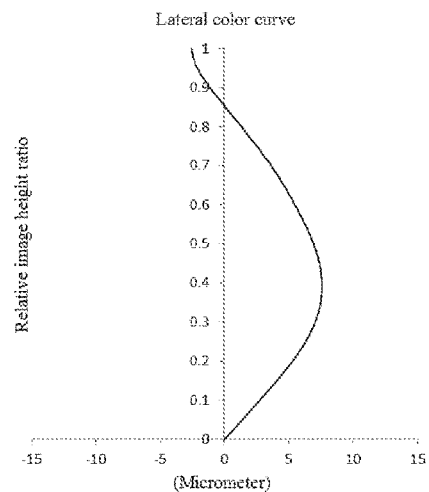
FIG. 40 is a diagram showing a lateral color curve (μm) of the camera lens in embodiment 8.

Reference will be made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

In the description of the present disclosure, it should be understood that terms such as "central," "longitudinal," "lateral," "length," "width," "thickness," "upper," "lower," "front," "rear," "left," "right," "vertical," "horizontal," "top," "bottom," "inner," "outer," "clockwise," and "counterclockwise" should be construed to refer to the orientation as then described or as shown in the drawings under discussion. These relative terms are for convenience of description and do not require that the present invention be constructed or operated in a particular orientation. In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, the term "a plurality of" means two or more than two, unless specified otherwise.

In the present invention, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present invention, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Various embodiments and examples are provided in the following description to implement different structures of the present disclosure. In order to simplify the present disclosure, certain elements and settings will be described. However, these elements and settings are only by way of example and are not intended to limit the present disclosure. In addition, reference numerals may be repeated in different examples in the present disclosure. This repeating is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied.

Referring to FIG. 1, a camera lens according to embodiments of the present disclosure includes a first lens L1 having a negative refractive power, a second lens L2 having a refractive power, a third lens L3 having a positive refractive power, a fourth lens L4 having a refractive power, a fifth lens L5 having a refractive power, a sixth lens L6 having a refractive power and a seventh lens L7 having a refractive power in sequence from an object side to an image side.

The first lens L1 has an object-side surface S1 and an image-side surface S2. The second lens L2 has an object-side surface S3 and an image-side surface S4. The third lens L3 has an object-side surface S5 and an image-side surface S6, and the image-side surface S6 is a concave surface. The fourth lens L4 has an object-side surface S7 and an image-side surface S8. The fifth lens L5 has an object-side surface S9 and an image-side surface 510. The sixth lens L6 has an object-side surface S11 and an image-side surface 512. The seventh lens E7 has an object-side surface S13 and an image-side surface S14, and the object-side surface S13 and the image-side surface S14 each are an aspheric surface.

In some embodiments, the camera lens further includes an aperture stop STO disposed between the third lens L3 and the fourth lens L4.

During imaging, light rays emitted from or reflected by an object OBJ enter the camera lens from the first lens L1 and pass through an optical filter L8 having an object-side surface S15 and an image-side surface S16, and finally form an image at an imaging surface S17.

In some embodiments, the camera lens satisfies a conditional expression:

$$-2<f1/f<-1.4,$$

in which, f1 denotes an effective focal length of the first lens L1, f denotes an effective focal length of the camera lens.

Satisfying the above conditional expression will allows the refractive power of the first lens L1 to be allocated reasonably, so that the camera lens may effectively correct various aberrations.

In some embodiments, the object-side surface S5 of the third lens L3 is a convex surface.

Satisfying the above conditional expression may advantageously ensure the positive refractive power of the third lens L3, so that the camera lens has a higher capacity of shrinking the rays, thereby expanding the field angle of the camera lens.

In some embodiments, the fourth lens L4 has a positive refractive power, the object-side surface S7 of the fourth lens is a convex surface and the image-side surface S8 of the fourth lens is a convex surface.

The fourth lens L4 undertakes the main refractive power of the camera lens, and satisfying the above condition can counteract negative optical aberration produced by the first three lenses, moreover a caliber behind the aperture stop STO is small, thereby controlling introduction of high-order aberration to the utmost extent.

In some embodiments, the camera lens satisfies a conditional expression:

$$0.5<R5/R7<1,$$

in which, R5 denotes a radius of curvature of the object-side surface S5 of the third lens L3; R7 denotes a radius of curvature of the object-side surface S7 of the fourth lens L4.

Satisfying the above conditional expression can control a lateral color better, and avoid introduction of the high-order aberration from an aspect of color aberration.

In some embodiments, the fifth lens L5 has a negative refractive power, the object-side surface S9 of the fifth lens is a convex surface and the image-side surface S10 of the fifth lens is a concave surface. The camera lens satisfies a conditional expression:

$$-4.1<f5/f<-3.5,$$

in which, f5 denotes an effective focal length of the fifth lens L5, f denotes the effective focal length of the camera lens.

A main function of the fifth lens L5 is to counteract accumulative spherical aberrations and color aberrations produced by the former several lenses, and an outer diameter of the fifth lens L5 is limited to facilitate easy installation in the engineering.

In some embodiments, the sixth lens L6 has a positive refractive power, the image-side surface S12 of the sixth lens is a convex surface.

Satisfying the above conditional expression can allow the sixth lens L6 to serve as a field lens, thereby gathering light rays in a small range and facilitating miniaturization of the camera lens.

In some embodiments, the camera lens satisfies a conditional expression:

$$1.7<ImgH/f<2,$$

in which, ImgH denotes a half of a diagonal line of an effective pixel area in the imaging surface S17; f denotes the effective focal length of the camera lens.

In the optical system, in the case of equal image height, an overlong focal length means a greater negative distortion, and an over-short focal length means poor manufacturability and is not easy to ensure brightness of a marginal image surface. Satisfying the above conditional expression gives consideration to distortion, image quality and manufacturability at the same time.

In some embodiments, the camera lens satisfies a conditional expression:

0.18<ΣT/TTL<0.45, in which, ΣT denotes a sum of axial spacing distance between any two adjacent lenses of the first lens L1, the second lens, the third lens, the fourth lens, the fifth lens, the sixth lens and the seventh lens L7; TTL denotes an axial distance between the object-side surface S1 of the first lens L1 and the imaging surface S 17.

In the case of same sizes, an overlong axial spacing distance may cause an uneven distribution of sizes of a single lens and goes against the miniaturization. An overshort axial spacing distance may goes against assemblage, an off-axis aberration is not easy to correct, and a risk of production of a ghost image increases. Satisfying the above conditional expression gives consideration to manufacturability and image quality at the same time.

In some embodiments, the camera lens satisfies a conditional expression:

0.95<CT2/CT5<1.5, in which, CT2 denotes a center thickness of the second lens L2 on an optical axis, and CT5 denotes a center thickness of the fifth lens L5 on the optical axis.

If the second lens L2 and the fifth lens L5 are too thick, correction of a monochromatic aberration may be disadvantageous, and if the second lens L2 and the fifth lens L5 are too thin, manufacturing and assembling of the lens may be disadvantageous. Satisfying the above conditional expression may give consideration to both manufacturability and feasibility of properties.

In some embodiments, the camera lens satisfies a conditional expression:

0.18<(CT3+CT6)/TTL<0.5, in which, CT3 denotes a center thickness of the third lens L3 on the optical axis, CT6 denotes a center thickness of the sixth lens L6 on the optical axis, and TTL denotes the axial distance between the object-side surface S1 of the first lens L1 and the imaging surface S17.

If the ratio is too large, whole distribution of refractive power of the camera lens may be influenced, and if the ratio is too small, the manufacturability may be greatly reduced. The range of the ratio reasonably allocates the refractive power and facilitates the manufacture and production.

In some embodiments, the camera lens satisfies a conditional expression:

1.6<SAG71/CT7<−1, in which, SAG71 denotes an axial distance from an intersection point between the object-side surface S13 of the seventh lens L7 and the optical axis to a vertex of an effective radius of the object-side surface S1 of the first lens L1, and CT7 denotes a center thickness of the seventh lens L7 on the optical axis.

The range of the ratio effectively solves field curvature of the lens, reduces the distortion aberration and increases the caliber of the lens while ensuring manufacturability of the product, thereby facilitating the miniaturization of the lens.

In some embodiments, the camera lens satisfies a conditional expression:

0.9<DT11/DT72<1.2, in which, DT11 denotes an effective radius of the object-side surface S1 of the first lens L1; DT72 denotes an effective radius of the image-side S14 of the seventh lens L7.

Satisfying the above conditional expression may effectively control a width of light beam of respective fields, thereby improving a relative illumination value while effectively balancing size and manufacturability of the lens.

In some embodiments, the camera lens satisfies a conditional expression:

0.8<DT21/DT52<1.1, in which, DT21 denotes an effective radius of the object-side surface S3 of the second lens L2; DT52 denotes an effective radius of the image-side surface S10 of the fifth lens L5.

Through cooperation between effective radiuses of the second lens L5 and the fifth lens L5, satisfying the above conditional expression is beneficial to correction of the color aberration and the monochromatic aberration of the camera lens, thereby achieving the balance between various aberrations.

In some embodiments, the first lens L1, the second lens L2, the third lens L3, the fourth lens L4, the fifth lens L5, the sixth lens L6 and the seventh lens L7 each are an aspheric lens. A surface shape of an aspheric surface is defined by a following formula:

$$x = \frac{ch^2}{1 + \sqrt{1 - (k+1)c^2h^2}} + \sum A_i h^i,$$

in which, h denotes a height from any point on the aspheric surface to the optical axis, c denotes a curvature of an apex, k denotes a conic constant, Ai denotes an i-th order correction coefficient of the aspheric surface.

Embodiment 1

Referring to FIG. 1 to FIG. 5, in embodiment 1, the camera lens satisfies conditions shown in following tables:

TABLE 1

| Surface Number | Surface Type | Radius of Curvature | Thickness | Material | Conic Coefficient |
|---|---|---|---|---|---|
| OBJ | Spherical Surface | Infinite | Infinite | | |
| S1 | Aspheric Surface | −230.1942 | 0.3300 | 1.54/55.8 | −16.8242 |
| S2 | Aspheric Surface | 1.1572 | 0.7183 | | −6.4494 |
| S3 | Aspheric Surface | −30.0371 | 0.2300 | 1.64/23.5 | 50.0000 |
| S4 | Aspheric Surface | 12.7040 | 0.0300 | | 11.5796 |
| S5 | Aspheric Surface | 1.8484 | 0.3097 | 1.64/23.5 | −2.0325 |
| S6 | Aspheric Surface | 4.9847 | 0.1000 | | 49.9369 |
| STO | Spherical Surface | Infinite | 0.1000 | | |
| S7 | Aspheric Surface | 2.1991 | 0.4675 | 1.54/55.8 | 4.1066 |
| S8 | Aspheric Surface | −1.7691 | 0.0504 | | 4.9349 |
| S9 | Aspheric Surface | 4.3640 | 0.2300 | 1.64/23.5 | 10.0064 |
| S10 | Aspheric Surface | 1.8071 | 0.1023 | | −7.4262 |
| S11 | Aspheric Surface | 103.5386 | 0.8843 | 1.54/55.8 | 47.1001 |
| S12 | Aspheric Surface | −0.6566 | 0.0768 | | −3.5639 |
| S13 | Aspheric Surface | 4.7287 | 0.3595 | 1.64/23.5 | −36.6676 |
| S14 | Aspheric Surface | 0.7936 | 0.3677 | | −7.2251 |
| S15 | Spherical Surface | Infinite | 0.1100 | 1.52/64.2 | |
| S16 | Spherical Surface | Infinite | 0.5336 | | |
| S17 | Spherical Surface | Infinite | | | |

TABLE 2

| Surface Number | A4 | A6 | A8 | A10 | A12 | A14 | A16 |
|---|---|---|---|---|---|---|---|
| S1 | 3.0281E−01 | −2.9641E−01 | 2.1600E−01 | −1.1009E−01 | 3.4869E−02 | −6.0661E−03 | 4.4571E−04 |
| S2 | 9.3727E−01 | −7.6242E−01 | 1.6951E+00 | −4.9541E+00 | 1.0395E+01 | −1.1240E+01 | 4.4076E+00 |
| S3 | 9.6906E−02 | 2.0004E−01 | −7.8401E−01 | 4.7061E−01 | 0.0000E+00 | 0.0000E+00 | 0.0000E+00 |
| S4 | 4.4197E−01 | −1.1938E−01 | −2.4082E−01 | −1.3122E+00 | 1.2709E+00 | 0.0000E+00 | 0.0000E+00 |
| S5 | 2.6344E−01 | −2.6851E−01 | 6.9731E−02 | −7.5185E−03 | 2.9315E−04 | 0.0000E+00 | 0.0000E+00 |
| S6 | −7.2952E−02 | −1.1428E−01 | 1.0189E+00 | 0.0000E+00 | 0.0000E+00 | 0.0000E+00 | 0.0000E+00 |
| S7 | 3.5311E−02 | −5.1758E−02 | −5.9313E−01 | 2.0333E+00 | −3.9247E+00 | 0.0000E+00 | 0.0000E+00 |
| S8 | −7.1914E−01 | 3.4819E+00 | −1.2144E+01 | 2.1309E+01 | −1.3775E+01 | 0.0000E+00 | 0.0000E+00 |
| S9 | −1.3771E+00 | 3.5312E+00 | −1.4090E+01 | 4.1010E+01 | −1.0826E+02 | 1.8181E+02 | −1.1946E+02 |
| S10 | −4.4378E−01 | 7.3130E−01 | −2.7694E−01 | −1.9477E+00 | 4.2923E+00 | −3.5213E+00 | 1.0825E+00 |
| S11 | 4.2441E−02 | −3.5820E−01 | 1.7511E+00 | −3.7205E+00 | 4.0723E+00 | −2.2867E+00 | 5.3185E−01 |
| S12 | −1.4631E−01 | −6.6189E−01 | 2.4102E+00 | −4.2984E+00 | 4.2127E+00 | −2.0489E+00 | 3.9367E−01 |
| S13 | −2.5667E−01 | −3.5946E−01 | 8.3561E−01 | −1.0269E+00 | 6.3925E−01 | −1.6282E−01 | 1.0078E−02 |
| S14 | −1.8185E−01 | 7.9547E−02 | −1.9533E−02 | −6.2938E−03 | 5.5078E−03 | −1.3305E−03 | 1.0632E−04 |

TABLE 3

| | | | |
|---|---|---|---|
| f1(mm) | −2.14 | f(mm) | 1.32 |
| f2(mm) | −13.82 | Fno | 2.43 |
| f3(mm) | 4.39 | HFOV(°) | 71.92 |
| f4(mm) | 1.9 | | |
| f5(mm) | −4.96 | | |
| f6(mm) | 1.22 | | |
| f7(mm) | −1.53 | | |

Embodiment 2

Referring to FIG. 6 to FIG. 10, in embodiment 2, the camera lens satisfies conditions shown in following tables:

TABLE 4

| Surface Number | Surface Type | Radius of Curvature | Thickness | Material | Conic Coefficient |
|---|---|---|---|---|---|
| OBJ | Spherical Surface | Infinite | Infinite | | |
| S1 | Aspheric Surface | 389.6303 | 0.3306 | 1.54/55.8 | −16.8242 |
| S2 | Aspheric Surface | 1.1288 | 0.7072 | | −6.4494 |
| S3 | Aspheric Surface | −27.7441 | 0.2328 | 1.64/23.5 | 50.0000 |
| S4 | Aspheric Surface | 17.9251 | 0.0457 | | 11.5796 |
| S5 | Aspheric Surface | 1.9212 | 0.2557 | 1.64/23.5 | −1.8562 |
| S6 | Aspheric Surface | 4.6246 | 0.1003 | | 49.9369 |
| STO | Spherical Surface | Infinite | 0.1066 | | |
| S7 | Aspheric Surface | 2.1026 | 0.4979 | 1.54/55.8 | 3.9751 |
| S8 | Aspheric Surface | −1.7827 | 0.0500 | | 4.9225 |
| S9 | Aspheric Surface | 4.3178 | 0.2300 | 1.64/23.5 | 10.0064 |
| S10 | Aspheric Surface | 1.8464 | 0.1003 | | −7.3259 |
| S11 | Aspheric Surface | 62.3174 | 0.8934 | 1.54/55.8 | 47.1001 |
| S12 | Aspheric Surface | −0.6289 | 0.1003 | | −3.4836 |
| S13 | Aspheric Surface | −1000.0000 | 0.3673 | 1.64/23.5 | −36.6676 |
| S14 | Aspheric Surface | 0.9014 | 0.3530 | | −8.1161 |
| S15 | Spherical Surface | Infinite | 0.1100 | 1.52/64.2 | |
| S16 | Spherical Surface | Infinite | 0.5190 | | |
| S17 | Spherical Surface | Infinite | | | |

TABLE 5

| Surface Number | A4 | A6 | A8 | A10 | A12 | A14 | A16 |
|---|---|---|---|---|---|---|---|
| S1 | 3.3762E−01 | −3.5776E−01 | 2.6971E−01 | −1.3869E−01 | 4.4254E−02 | −7.7980E−03 | 5.8280E−04 |
| S2 | 9.8170E−01 | −5.2274E−01 | 2.3897E+00 | −1.7315E+00 | 6.8250E+00 | −9.2319E+00 | 3.9323E+00 |
| S3 | 1.0225E−01 | 1.6458E−01 | −7.0430E−01 | 4.2280E−01 | 0.0000E+00 | 0.0000E+00 | 0.0000E+00 |
| S4 | 4.5058E−01 | −1.6172E−01 | −2.4894E−01 | −1.2230E+00 | 1.2206E+00 | 0.0000E+00 | 0.0000E+00 |
| S5 | 2.8058E−01 | −2.7489E−01 | 7.0957E−02 | −7.6324E−03 | 2.9720E−04 | 0.0000E+00 | 0.0000E+00 |
| S6 | −5.9466E−02 | −9.3517E−02 | 7.8861E−01 | 0.0000E+00 | 0.0000E+00 | 0.0000E+00 | 0.0000E+00 |
| S7 | 2.9415E−02 | −2.9167E−02 | −7.9405E−01 | 2.8017E+00 | −4.8794E+00 | 0.0000E+00 | 0.0000E+00 |
| S8 | −8.1203E−01 | 3.9535E+00 | −1.3471E+01 | 2.3567E+01 | −1.5354E+01 | 0.0000E+00 | 0.0000E+00 |
| S9 | −1.4234E+00 | 3.6259E+00 | −1.4079E+01 | 4.1482E+01 | −1.1187E+02 | 1.8940E+02 | −1.2464E+02 |
| S10 | −4.3546E−01 | 6.9112E−01 | −2.4385E−01 | −1.6944E+00 | 3.3900E+00 | −2.4109E+00 | 6.1554E−01 |
| S11 | 9.7085E−03 | −1.3724E−01 | 1.0545E+00 | −2.5059E+00 | 2.8051E+00 | −1.5441E+00 | 3.4228E−01 |
| S12 | −1.5120E−01 | −6.9086E−01 | 2.6398E+00 | −4.7406E+00 | 4.5782E+00 | −2.1854E+00 | 4.1216E−01 |
| S13 | −8.7103E−02 | −9.0866E−01 | 1.9451E+00 | −2.3075E+00 | 1.4546E+00 | −4.2796E−01 | 4.4493E−02 |
| S14 | −1.7670E−01 | 8.1199E−02 | −2.0694E−02 | −6.4398E−03 | 5.7427E−03 | −1.3825E−03 | 1.0977E−04 |

TABLE 6

| | | | |
|---|---|---|---|
| f1(mm) | −2.11 | f(mm) | 1.32 |
| f2(mm) | −16.86 | Fno | 2.53 |
| f3(mm) | 4.92 | HFOV(°) | 74.41 |
| f4(mm) | 1.88 | | |
| f5(mm) | −5.19 | | |
| f6(mm) | 1.17 | | |
| f7(mm) | −1.4 | | |

Embodiment 3

Referring to FIG. 11 to FIG. 15, in embodiment 3, the camera lens satisfies conditions shown in following tables:

TABLE 7

| Surface Number | Surface Type | Radius of Curvature | Thickness | Material | Conic Coefficient |
|---|---|---|---|---|---|
| OBJ | Spherical Surface | Infinite | Infinite | | |
| S1 | Aspheric Surface | −230.1942 | 0.3300 | 1.54/55.8 | −16.8242 |
| S2 | Aspheric Surface | 1.1572 | 0.7183 | | −6.4494 |
| S3 | Aspheric Surface | −30.0371 | 0.2300 | 1.64/23.5 | 50.0000 |
| S4 | Aspheric Surface | 12.7040 | 0.0300 | | 11.5796 |
| S5 | Aspheric Surface | 1.8484 | 0.3097 | 1.64/23.5 | −2.0325 |
| S6 | Aspheric Surface | 4.9847 | 0.1000 | | 49.9369 |
| STO | Spherical Surface | Infinite | 0.1000 | | |
| S7 | Aspheric Surface | 2.1991 | 0.4675 | 1.54/55.8 | 4.1066 |
| S8 | Aspheric Surface | −1.7691 | 0.0504 | | 4.9349 |
| S9 | Aspheric Surface | 4.3640 | 0.2300 | 1.64/23.5 | 10.0064 |
| S10 | Aspheric Surface | 1.8071 | 0.1023 | | −7.4262 |
| S11 | Aspheric Surface | −1000.0000 | 0.8843 | 1.54/55.8 | 47.1001 |
| S12 | Aspheric Surface | −0.6566 | 0.0768 | | −3.5639 |
| S13 | Aspheric Surface | 4.7287 | 0.3595 | 1.64/23.5 | −36.6676 |
| S14 | Aspheric Surface | 0.7936 | 0.3677 | | −7.2251 |
| S15 | Spherical Surface | Infinite | 0.1100 | 1.52/64.2 | |
| S16 | Spherical Surface | Infinite | 0.5336 | | |
| S17 | Spherical Surface | Infinite | | | |

TABLE 8

| Surface Number | A4 | A6 | A8 | A10 | A12 | A14 | A16 |
|---|---|---|---|---|---|---|---|
| S1 | 3.0281E−01 | −2.9641E−01 | 2.1600E−01 | −1.1009E−01 | 3.4869E−02 | −6.0661E−03 | 4.4571E−04 |
| S2 | 9.3727E−01 | −7.6242E−01 | 1.6951E+00 | −4.9541E+00 | 1.0395E+01 | −1.1240E+01 | 4.4076E+00 |
| S3 | 9.6906E−02 | 2.0004E−01 | −7.8401E−01 | 4.7061E−01 | 0.0000E+00 | 0.0000E+00 | 0.0000E+00 |
| S4 | 4.4197E−01 | −1.1938E−01 | −2.4082E−01 | −1.3122E+00 | 1.2709E+00 | 0.0000E+00 | 0.0000E+00 |
| S5 | 2.6344E−01 | −2.6851E−01 | 6.9731E−02 | −7.5185E−03 | 2.9315E−04 | 0.0000E+00 | 0.0000E+00 |
| S6 | −7.2952E−02 | −1.1428E−01 | 1.0189E+00 | 0.0000E+00 | 0.0000E+00 | 0.0000E+00 | 0.0000E+00 |
| S7 | 3.5311E−02 | −5.1758E−02 | −5.9313E−01 | 2.0333E+00 | −3.9247E+00 | 0.0000E+00 | 0.0000E+00 |
| S8 | −7.1914E−01 | 3.4819E+00 | −1.2144E+01 | 2.1309E+01 | −1.3775E+01 | 0.0000E+00 | 0.0000E+00 |
| S9 | −1.3771E+00 | 3.5312E+00 | −1.4090E+01 | 4.1010E+01 | −1.0826E+02 | 1.8181E+02 | −1.1946E+02 |
| S10 | −4.4378E−01 | 7.3130E−01 | −2.7694E−01 | −1.9477E+00 | 4.2923E+00 | −3.5213E+00 | 1.0825E+00 |
| S11 | 4.2441E−02 | −3.5820E−01 | 1.7511E+00 | −3.7205E+00 | 4.0723E+00 | −2.2867E+00 | 5.3185E−01 |
| S12 | −1.4631E−01 | −6.6189E−01 | 2.4102E+00 | −4.2984E+00 | 4.2127E+00 | −2.0489E+00 | 3.9367E−01 |
| S13 | −2.5667E−01 | −3.5946E−01 | 8.3561E−01 | −1.0269E+00 | 6.3925E−01 | −1.6282E−01 | 1.0078E−02 |
| S14 | −1.8185E−01 | 7.9547E−02 | −1.9533E−02 | −6.2938E−03 | 5.5078E−03 | −1.3305E−03 | 1.0632E−04 |

TABLE 9

| f1(mm) | −2.14 | f(mm) | 1.34 |
|---|---|---|---|
| f2(mm) | −13.82 | Fno | 2.53 |
| f3(mm) | 4.39 | HFOV(°) | 73.99 |
| f4(mm) | 1.9 | | |
| f5(mm) | −4.96 | | |
| f6(mm) | 1.22 | | |
| f7(mm) | −1.53 | | |

Embodiment 4

Referring to FIG. 16 to FIG. 20, in embodiment 4, the camera lens satisfies conditions shown in following tables:

TABLE 10

| Surface Number | Surface Type | Radius of Curvature | Thickness | Material | Conic Coefficient |
|---|---|---|---|---|---|
| OBJ | Spherical Surface | Infinite | Infinite | | |
| S1 | Aspheric Surface | −1000.0000 | 0.3340 | 1.54/55.8 | −16.8242 |
| S2 | Aspheric Surface | 1.1653 | 0.7168 | | −6.1094 |
| S3 | Aspheric Surface | −25.3674 | 0.2413 | 1.64/23.5 | 50.0000 |
| S4 | Aspheric Surface | 12.0471 | 0.0522 | | 11.5796 |
| S5 | Aspheric Surface | 1.8361 | 0.2553 | 1.64/23.5 | −1.9910 |
| S6 | Aspheric Surface | 4.9022 | 0.1033 | | 49.9369 |
| STO | Spherical Surface | Infinite | 0.1050 | | |
| S7 | Aspheric Surface | 2.1375 | 0.4810 | 1.54/55.8 | 4.0277 |
| S8 | Aspheric Surface | −1.7748 | 0.0500 | | 4.9006 |
| S9 | Aspheric Surface | 4.3403 | 0.2300 | 1.64/23.5 | 10.0064 |
| S10 | Aspheric Surface | 1.8428 | 0.1053 | | −7.3029 |
| S11 | Aspheric Surface | −1000.0000 | 0.8861 | 1.54/55.8 | 47.1001 |
| S12 | Aspheric Surface | −0.6243 | 0.0926 | | −3.4404 |
| S13 | Aspheric Surface | −1000.0000 | 0.3656 | 1.64/23.5 | −36.6676 |
| S14 | Aspheric Surface | 0.9090 | 0.3528 | | −8.1161 |
| S15 | Spherical Surface | Infinite | 0.1100 | 1.52/64.2 | |
| S16 | Spherical Surface | Infinite | 0.5188 | | |
| S17 | Spherical Surface | Infinite | | | |

TABLE 11

| Surface Number | A4 | A6 | A8 | A10 | A12 | A14 | A16 |
|---|---|---|---|---|---|---|---|
| S1 | 3.1494E-01 | -2.6773E-01 | 1.2736E-01 | -2.3456E-02 | -5.8805E-03 | 3.3138E-03 | -4.0168E-04 |
| S2 | 8.7315E-01 | -1.5558E-01 | -1.2306E+00 | 2.3953E+00 | -2.6178E-01 | -3.0303E+00 | 1.8493E+00 |
| S3 | 1.1232E-01 | 1.2780E-01 | -6.7290E-01 | 4.2105E-01 | 0.0000E+00 | 0.0000E+00 | 0.0000E+00 |
| S4 | 4.5947E-01 | -1.6317E-01 | -2.0057E-01 | -1.3372E+00 | 1.2831E+00 | 0.0000E+00 | 0.0000E+00 |
| S5 | 2.6965E-01 | -2.7156E-01 | 7.0397E-02 | -7.5851E-03 | 2.9564E-04 | 0.0000E+00 | 0.0000E+00 |
| S6 | -6.0546E-02 | -1.1539E-01 | 9.6948E-02 | 0.0000E+00 | 0.0000E+00 | 0.0000E+00 | 0.0000E+00 |
| S7 | 2.7800E-02 | -4.6716E-03 | -8.3865E-01 | 2.7444E+00 | -4.6538E+00 | 0.0000E+00 | 0.0000E+00 |
| S8 | -8.1827E-01 | 4.0044E+00 | -1.3618E+01 | 2.3661E+01 | -1.5271E+01 | 0.0000E+00 | 0.0000E+00 |
| S9 | -1.4386E+00 | 3.5939E+00 | -1.3753E+01 | 4.0523E+01 | -1.1168E+02 | 1.9244E+02 | -1.2785E+02 |
| S10 | -4.3314E-01 | 6.7145E-01 | -1.6762E-01 | -1.9835E+00 | 4.0737E+00 | -3.1486E+00 | 9.0117E-01 |
| S11 | -8.4985E-04 | 6.0729E-02 | 2.1042E-01 | -7.4849E-01 | 7.9237E-01 | -3.2341E-01 | 3.5859E-02 |
| S12 | -1.4823E-01 | -6.7279E-01 | 2.5774E+00 | -4.6016E+00 | 4.3977E+00 | -2.0737E+00 | 3.8678E-01 |
| S13 | -7.5742E-02 | -9.5074E-01 | 2.0497E+00 | -2.5031E+00 | 1.6479E+00 | -5.1582E-01 | 5.9155E-02 |
| S14 | -1.7703E-01 | 8.1915E-02 | -2.4350E-02 | -3.8331E-03 | 4.9442E-03 | -1.2700E-03 | 1.0384E-04 |

TABLE 12

| f1(mm) | -2.17 | f(mm) | 1.32 |
|---|---|---|---|
| f2(mm) | -12.64 | Fno | 2.53 |
| f3(mm) | 4.41 | HFOV(°) | 74.58 |
| f4(mm) | 1.89 | | |
| f5(mm) | -5.15 | | |
| f6(mm) | 1.16 | | |
| f7(mm) | -1.41 | | |

Embodiment 5

Referring to FIG. 21 to FIG. 25, in embodiment 5, the camera lens satisfies conditions shown in following tables:

TABLE 13

| Surface Number | Surface Type | Radius of Curvature | Thickness | Material | Conic Coefficient |
|---|---|---|---|---|---|
| OBJ | Spherical Surface | Infinite | Infinite | | |
| S1 | Aspheric Surface | 18.8800 | 0.3300 | 1.54/55.8 | -16.8242 |
| S2 | Aspheric Surface | 1.0460 | 0.7205 | | -5.3117 |
| S3 | Aspheric Surface | 129.8261 | 0.2200 | 1.64/23.5 | 50.0000 |
| S4 | Aspheric Surface | 3.7463 | 0.0300 | | 11.5797 |
| S5 | Aspheric Surface | 1.5197 | 0.2200 | 1.64/23.5 | 0.0663 |
| S6 | Aspheric Surface | 4.7604 | 0.1000 | | 49.9370 |
| STO | Spherical Surface | Infinite | 0.1000 | | |
| S7 | Aspheric Surface | 2.5187 | 0.4530 | 1.54/55.8 | 5.6101 |
| S8 | Aspheric Surface | -1.6917 | 0.0687 | | 4.5224 |
| S9 | Aspheric Surface | 4.3052 | 0.2200 | 1.64/23.5 | 10.0064 |
| S10 | Aspheric Surface | 1.7471 | 0.0803 | | -11.3748 |
| S11 | Aspheric Surface | 8.6476 | 0.9449 | 1.54/55.8 | 47.1001 |
| S12 | Aspheric Surface | -0.7201 | 0.0200 | | -3.0320 |
| S13 | Aspheric Surface | 2.2965 | 0.3489 | 1.64/23.5 | -36.6676 |
| S14 | Aspheric Surface | 0.7422 | 0.4339 | | -5.7344 |
| S15 | Spherical Surface | Infinite | 0.1100 | 1.52/64.2 | |
| S16 | Spherical Surface | Infinite | 0.5998 | | |
| S17 | Spherical Surface | Infinite | | | |

TABLE 14

| Surface Number | A4 | A6 | A8 | A10 | A12 | A14 | A16 |
|---|---|---|---|---|---|---|---|
| S1 | 3.4414E-01 | -3.7913E-01 | 3.0917E-01 | -1.7498E-01 | 6.1534E-02 | -1.1922E-02 | 9.7823E-04 |
| S2 | 1.0910E+00 | -9.3967E-01 | 2.4371E+00 | -8.2943E+00 | 1.9725E+01 | -2.3954E+01 | 1.0521E+01 |
| S3 | 7.5744E-02 | -1.6187E-01 | -1.7908E-01 | 2.6287E-01 | 0.0000E+00 | 0.0000E+00 | 0.0000E+00 |
| S4 | -2.1746E-11 | 1.5360E-14 | -3.5752E-18 | 3.2767E-22 | -9.9470E-27 | 0.0000E+00 | 0.0000E+00 |
| S5 | -1.6319E-01 | 5.0097E-02 | -7.7523E-03 | 5.8573E-04 | -1.7245E-05 | 0.0000E+00 | 0.0000E+00 |
| S6 | -1.6774E-02 | -3.3506E-01 | 9.8211E-01 | 0.0000E+00 | 0.0000E+00 | 0.0000E+00 | 0.0000E+00 |
| S7 | 9.3380E-02 | -1.8578E-01 | -1.6228E+00 | 1.5800E+00 | -4.3610E+00 | 0.0000E+00 | 0.0000E+00 |
| S8 | -6.2227E-01 | 3.1525E+00 | -1.2012E+01 | 2.3580E+01 | -1.7660E+01 | 0.0000E+00 | 0.0000E+00 |
| S9 | -1.3893E+00 | 3.8601E+00 | -1.6212E+01 | 4.5565E+01 | -1.0739E+02 | 1.6350E+02 | -1.0171E+02 |
| S10 | -4.8081E-01 | 9.6420E-01 | -9.9956E-01 | -1.0458E+00 | 3.9569E+00 | -3.7457E+00 | 1.2384E+00 |
| S11 | 1.3978E-02 | -7.1223E-01 | 3.5463E+00 | -8.2179E+00 | 1.0213E+01 | -6.6095E+00 | 1.7555E+00 |
| S12 | -1.9048E-01 | -2.3070E-01 | 7.6554E-01 | -1.2449E+00 | 1.2493E+00 | -6.3262E-01 | 1.3816E-01 |
| S13 | -3.8531E-01 | 1.4563E-02 | -3.0938E-01 | 9.6819E-01 | -1.1462E+00 | 6.0997E-01 | -1.1685E-01 |
| S14 | -2.5452E-01 | 1.3997E-01 | -3.8017E-02 | -7.7925E-03 | 8.3604E-03 | -2.1311E-03 | 1.7976E-04 |

TABLE 15

| f1(mm) | -2.08 | f(mm) | 1.32 |
|---|---|---|---|
| f2(mm) | -5.99 | Fno | 2.52 |
| f3(mm) | 3.37 | HFOV(°) | 74.39 |
| f4(mm) | 1.96 | | |
| f5(mm) | -4.72 | | |
| f6(mm) | 1.28 | | |
| f7(mm) | -1.87 | | |

Embodiment 6

Referring to FIG. 26 to FIG. 30, in embodiment 6, the camera lens satisfies conditions shown in following tables:

TABLE 16

| Surface Number | Surface Type | Radius of Curvature | Thickness | Material | Conic Coefficient |
|---|---|---|---|---|---|
| OBJ | Spherical Surface | Infinite | Infinite | | |
| S1 | Aspheric Surface | −22.2689 | 0.3300 | 1.54/55.8 | −16.8242 |
| S2 | Aspheric Surface | 1.1652 | 0.6839 | | −7.2141 |
| S3 | Aspheric Surface | 14.3340 | 0.2200 | 1.64/23.5 | 50.0000 |
| S4 | Aspheric Surface | 4.0971 | 0.0300 | | 11.5797 |
| S5 | Spherical Surface | 1.7332 | 0.2200 | 1.64/23.5 | |
| S6 | Aspheric Surface | 4.6031 | 0.1000 | | 49.9370 |
| STO | Spherical Surface | Infinite | 0.1000 | | |
| S7 | Aspheric Surface | 2.9426 | 0.4424 | 1.54/55.8 | 1.4563 |
| S8 | Aspheric Surface | −1.5691 | 0.0858 | | 4.4304 |
| S9 | Aspheric Surface | 4.2455 | 0.2200 | 1.64/23.5 | 10.0064 |
| S10 | Aspheric Surface | 1.8262 | 0.0754 | | −12.3970 |
| S11 | Aspheric Surface | 10.5230 | 0.9474 | 1.54/55.8 | 47.1001 |
| S12 | Aspheric Surface | −0.7189 | 0.0200 | | −2.9781 |
| S13 | Aspheric Surface | 2.2743 | 0.3600 | 1.64/23.5 | −36.6676 |
| S14 | Aspheric Surface | 0.7212 | 0.4446 | | −5.6355 |
| S15 | Spherical Surface | Infinite | 0.1100 | 1.52/64.2 | |
| S16 | Spherical Surface | Infinite | 0.6106 | | |
| S17 | Spherical Surface | Infinite | | | |

TABLE 17

| Surface Number | A4 | A6 | A8 | A10 | A12 | A14 | A16 |
|---|---|---|---|---|---|---|---|
| S1 | 2.9466E−01 | −2.8573E−01 | 2.0546E−01 | −1.0380E−01 | 3.3533E−02 | −6.1040E−03 | 4.7564E−04 |
| S2 | 9.4305E−01 | −8.2427E−01 | 1.6787E+00 | −4.5368E+00 | 9.0842E+00 | −1.0081E+01 | 4.1535E+00 |
| S3 | −4.8073E−02 | −2.0956E−02 | −2.3926E−01 | 2.7554E−01 | 0.0000E+00 | 0.0000E+00 | 0.0000E+00 |
| S4 | −2.1701E−11 | 1.5314E−14 | −3.5593E−18 | 3.2541E−22 | −9.8328E−27 | 0.0000E+00 | 0.0000E+00 |
| S6 | 7.3697E−02 | −1.9064E−01 | 1.2111E+00 | 0.0000E+00 | 0.0000E+00 | 0.0000E+00 | 0.0000E+00 |
| S7 | 1.0817E−01 | −3.2731E−01 | 4.8568E−01 | 2.4053E−01 | −6.9816E+00 | 0.0000E+00 | 0.0000E+00 |
| S8 | −6.2272E−01 | 2.3998E+00 | −7.9309E+00 | 1.6042E+01 | −1.3552E+01 | 0.0000E+00 | 0.0000E+00 |
| S9 | −1.3236E+00 | 2.5931E+00 | −9.9267E+00 | 2.9166E+01 | −6.5976E+01 | 8.8365E+01 | −4.9064E+01 |
| S10 | −3.0099E−01 | 1.0397E−01 | 6.4474E−01 | −1.4502E+00 | 1.1649E+00 | −8.7303E−02 | −2.3449E−01 |
| S11 | 1.9483E−01 | −7.9472E−01 | 1.8095E+00 | −2.5392E+00 | 2.1552E+00 | −1.0267E+00 | 2.1160E−01 |
| S12 | −9.1659E−02 | −5.3424E−01 | 1.4031E+00 | −2.1846E+00 | 2.1229E+00 | −1.0965E+00 | 2.4559E−01 |
| S13 | −2.8997E−01 | −2.4560E−01 | 2.8902E−01 | −2.4174E−01 | 2.0420E−01 | −8.6132E−02 | 1.4382E−02 |
| S14 | −2.1371E−01 | 7.8682E−02 | 1.2944E−03 | −2.1000E−02 | 1.1231E−02 | −2.5537E−03 | 2.1034E−04 |

TABLE 18

| f1(mm) | −2.05 | f(mm) | 1.34 |
|---|---|---|---|
| f2(mm) | −8.98 | Fno | 2.51 |
| f3(mm) | 4.19 | HFOV(°) | 74.14 |
| f4(mm) | 1.97 | | |
| f5(mm) | −5.16 | | |
| f6(mm) | 1.28 | | |
| f7(mm) | −1.8 | | |

Embodiment 7

Referring to FIG. 31 to FIG. 35, in embodiment 7, the camera lens satisfies conditions shown in following tables:

TABLE 19

| Surface Number | Surface Type | Radius of Curvature | Thickness | Material | Conic Coefficient |
|---|---|---|---|---|---|
| OBJ | Spherical Surface | Infinite | Infinite | | |
| S1 | Aspheric Surface | 909.6832 | 0.3318 | 1.54/55.8 | −16.8242 |
| S2 | Aspheric Surface | 1.1305 | 0.7376 | | −6.4493 |
| S3 | Aspheric Surface | −27.2966 | 0.2314 | 1.64/23.5 | 50.0000 |
| S4 | Aspheric Surface | 7.9398 | 0.0502 | | 11.5796 |
| S5 | Aspheric Surface | 1.7255 | 0.3151 | 1.64/23.5 | −2.1845 |
| S6 | Aspheric Surface | 5.2891 | 0.1004 | | 49.9370 |
| STO | Spherical Surface | Infinite | 0.1000 | | |
| S7 | Aspheric Surface | 2.1207 | 0.4726 | 1.55/65.0 | 3.8091 |
| S8 | Aspheric Surface | −1.8302 | 0.0720 | | 4.8407 |
| S9 | Aspheric Surface | 4.0156 | 0.2312 | 1.64/23.5 | 10.0064 |
| S10 | Aspheric Surface | 1.7998 | 0.1115 | | −8.0429 |
| S11 | Aspheric Surface | −40.4585 | 0.8560 | 1.54/55.8 | 47.1001 |
| S12 | Aspheric Surface | −0.6427 | 0.0684 | | −3.6259 |
| S13 | Aspheric Surface | 5.6011 | 0.3451 | 1.64/23.5 | −36.6676 |
| S14 | Aspheric Surface | 0.7937 | 0.3688 | | −7.7206 |
| S15 | Spherical Surface | Infinite | 0.1100 | 1.52/64.2 | |
| S16 | Spherical Surface | Infinite | 0.5348 | | |
| S17 | Spherical Surface | Infinite | | | |

TABLE 20

| Surface Number | A4 | A6 | A8 | A10 | A12 | A14 | A16 |
|---|---|---|---|---|---|---|---|
| S1 | 2.7612E−01 | −2.6105E−01 | 1.8045E−01 | −8.6268E−02 | 2.5689E−02 | −4.2180E−03 | 2.9328E−04 |
| S2 | 8.9794E−01 | −6.0108E−01 | 7.1519E−01 | −1.7970E+00 | 4.4380E+00 | −5.1213E+00 | 1.9350E+00 |
| S3 | 1.2623E−01 | 1.1428E−01 | −6.6815E−01 | 4.0534E−01 | 0.0000E+00 | 0.0000E+00 | 0.0000E+00 |
| S4 | 4.6140E−01 | −1.4236E−01 | −3.4656E−01 | −1.0556E+00 | 1.1329E+00 | 0.0000E+00 | 0.0000E+00 |
| S5 | 2.5874E−01 | −2.7656E−01 | 7.2257E−02 | −7.8005E−03 | 3.0402E−04 | 0.0000E+00 | 0.0000E+00 |
| S6 | −6.8323E−02 | −1.0705E−01 | 9.0221E−02 | 0.0000E+00 | 0.0000E+00 | 0.0000E+00 | 0.0000E+00 |
| S7 | 2.5754E−02 | −1.2829E−01 | −1.3953E−02 | 2.2177E−01 | −1.3423E+00 | 0.0000E+00 | 0.0000E+00 |
| S8 | −5.6640E−01 | 2.5729E+00 | −8.9791E+00 | 1.5619E+01 | −9.8984E+00 | 0.0000E+00 | 0.0000E+00 |
| S9 | −1.2976E+00 | 2.8756E+00 | −1.1411E+01 | 3.5617E+01 | −1.0105E+02 | 1.7262E+02 | −1.1287E+02 |
| S10 | −4.6113E−01 | 6.7963E−01 | −1.2929E+00 | −1.9865E+00 | 3.9768E+00 | −2.9003E+00 | 7.2731E−01 |
| S11 | 6.0369E−02 | −4.2236E−01 | 1.7012E+00 | −3.3753E+00 | 3.5981E+00 | −1.9797E+00 | 4.4948E−01 |
| S12 | −7.1947E−02 | −8.7144E−01 | 2.8044E+00 | −4.6689E+00 | 4.3533E+00 | −2.0598E+00 | 3.9043E−01 |
| S13 | −2.3492E−01 | −4.6759E−01 | 1.0536E+00 | −1.2269E+00 | 7.0061E−01 | −1.5140E−01 | 3.3569E−03 |
| S14 | −1.9948E−01 | 1.0381E−01 | −3.8431E−02 | 1.7280E−03 | 3.6666E−03 | −1.1505E−03 | 1.0283E−04 |

TABLE 21

| | | | |
|---|---|---|---|
| f1(mm) | −2.11 | f(mm) | 1.31 |
| f2(mm) | −9.52 | Fno | 2.53 |
| f3(mm) | 3.84 | HFOV(°) | 74.58 |
| f4(mm) | 1.87 | | |
| f5(mm) | −5.28 | | |
| f6(mm) | 1.21 | | |
| f7(mm) | −1.48 | | |

Embodiment 8

Referring to FIG. 36 to FIG. 40, in embodiment 8, the camera lens satisfies conditions shown in following tables:

TABLE 22

| Surface Number | Surface Type | Radius of Curvature | Thickness | Material | Conic Coefficient |
|---|---|---|---|---|---|
| OBJ | Spherical Surface | Infinite | Infinite | | |
| S1 | Aspheric Surface | −530.0698 | 0.3300 | 1.54/55.8 | −16.8242 |
| S2 | Aspheric Surface | 0.9153 | 0.7268 | | −5.0003 |
| S3 | Aspheric Surface | 72.5446 | 0.2300 | 1.64/23.5 | 50.0000 |
| S4 | Aspheric Surface | −17.9333 | 0.0300 | | 11.5796 |
| S5 | Aspheric Surface | 2.1262 | 0.3238 | 1.64/23.5 | −0.8829 |
| S6 | Aspheric Surface | 4.5619 | 0.1204 | | 49.9369 |
| STO | Spherical Surface | Infinite | 0.1028 | | |
| S7 | Aspheric Surface | 2.0142 | 0.4961 | 1.54/55.8 | 4.3360 |
| S8 | Aspheric Surface | −1.7535 | 0.0579 | | 4.7857 |
| S9 | Aspheric Surface | 4.9986 | 0.2318 | 1.64/23.5 | 10.0064 |
| S10 | Aspheric Surface | 1.7053 | 0.0782 | | −7.3951 |
| S11 | Aspheric Surface | 23.2928 | 0.7752 | 1.54/55.8 | 47.1001 |
| S12 | Aspheric Surface | −1.2797 | 0.1393 | | −3.3290 |
| S13 | Aspheric Surface | 300.0000 | 0.6523 | 1.64/23.5 | −36.6676 |
| S14 | Aspheric Surface | −100.0000 | 0.3647 | | −7.4306 |
| S15 | Spherical Surface | Infinite | 0.1100 | 1.52/64.2 | |
| S16 | Spherical Surface | Infinite | 0.4969 | | |
| S17 | Spherical Surface | Infinite | | | |

TABLE 23

| Surface Number | A4 | A6 | A8 | A10 | A12 | A14 | A16 |
|---|---|---|---|---|---|---|---|
| S1 | 2.4610E−01 | −2.1079E−01 | 1.2486E−01 | −5.3317E−02 | 1.4903E−02 | −2.3716E−03 | 1.6159E−04 |
| S2 | 1.2894E+00 | −2.7253E+00 | 1.2849E+01 | −3.8219E+01 | 6.6733E+01 | −6.0633E+01 | 2.1402E+01 |
| S3 | 6.2118E−02 | 3.2826E−01 | −8.5704E−01 | 4.1386E−01 | 0.0000E+00 | 0.0000E+00 | 0.0000E+00 |
| S4 | 4.6418E−01 | −1.9775E−01 | −1.1439E−01 | −1.3043E+00 | 1.2095E+00 | 0.0000E+00 | 0.0000E+00 |
| S5 | 3.7695E−01 | −3.1480E−01 | 7.8940E−02 | −8.3831E−03 | 3.2394E−04 | 0.0000E+00 | 0.0000E+00 |
| S6 | −5.8312E−02 | −4.3146E−02 | 8.0780E−01 | 0.0000E+00 | 0.0000E+00 | 0.0000E+00 | 0.0000E+00 |
| S7 | 2.2236E−02 | 1.3902E−02 | −3.0844E−01 | 4.4140E−01 | −1.7609E+00 | 0.0000E+00 | 0.0000E+00 |
| S8 | −7.8305E−01 | 2.5948E+00 | −6.2621E+00 | 9.7836E+00 | −6.2112E+00 | 0.0000E+00 | 0.0000E+00 |
| S9 | −1.5084E+00 | 2.5354E+00 | −1.0892E+01 | 4.0815E+01 | −1.2301E+02 | 2.1351E+02 | −1.4274E+02 |
| S10 | −4.6796E−01 | 5.1615E−01 | 9.1869E−01 | −4.0432E+00 | 4.9633E+00 | −1.8316E+00 | −1.5108E−01 |
| S11 | −2.5609E−02 | −3.4032E−01 | 3.3532E+00 | −9.4874E+00 | 1.2589E+01 | −8.1315E+00 | 2.0773E+00 |
| S12 | 3.0546E−02 | −1.2195E+00 | 2.6317E+00 | −3.3738E+00 | 2.9075E+00 | −1.3898E+00 | 2.7407E−01 |
| S13 | 1.3560E−01 | −8.6793E−01 | 9.7412E−01 | −7.1903E−01 | 3.3869E−01 | −6.9600E−02 | 2.1491E−03 |
| S14 | 1.4940E−01 | −3.0505E−01 | 2.3371E−01 | −1.0751E−01 | 3.0096E−02 | −4.7066E−03 | 3.0626E−04 |

TABLE 24

| | | | |
|---|---|---|---|
| f1(mm) | −1.70 | f(mm) | 1.19 |
| f2(mm) | 22.33 | Fno | 2.40 |
| f3(mm) | 5.87 | HFOV(°) | 73.86 |
| f4(mm) | 1.83 | | |
| f5(mm) | −4.13 | | |
| f6(mm) | 2.28 | | |
| f7(mm) | 116.43 | | |

In embodiments 1-8, each conditional expression satisfies conditions shown in a following table.

| Relation | Embodiment | | | | | | | |
|---|---|---|---|---|---|---|---|---|
| | 1 | 2 | 3 | 4 | 5 | 6 | 7 | 8 |
| f1/f | −1.62 | −1.60 | −1.60 | −1.65 | −1.58 | −1.53 | −1.60 | −1.43 |
| f5/f | −3.75 | −3.93 | −3.71 | −3.91 | −3.59 | −3.84 | −4.01 | −3.46 |
| ImgH/f | 1.78 | 1.84 | 1.81 | 1.84 | 1.84 | 1.80 | 1.84 | 1.97 |
| ΣT/TTL | 0.24 | 0.24 | 0.20 | 0.25 | 0.22 | 0.22 | 0.25 | 0.37 |
| CT2/CT5 | 1.00 | 1.01 | 1.00 | 1.45 | 1.50 | 1.50 | 1.44 | 0.99 |
| (CT3 + CT6)/TTL | 0.24 | 0.23 | 0.24 | 0.23 | 0.23 | 0.23 | 0.23 | 0.21 |
| R5/R7 | 0.84 | 0.91 | 0.84 | 0.86 | 0.60 | 0.59 | 0.81 | 1.06 |
| SAG71/CT7 | −1.33 | −1.33 | −1.33 | −1.34 | −1.28 | −1.36 | −1.56 | −0.64 |
| DT11/DT72 | 1.00 | 1.07 | 1.05 | 1.06 | 1.06 | 1.03 | 1.01 | 1.00 |
| DT21/DT52 | 0.96 | 0.93 | 0.92 | 0.93 | 0.86 | 1.03 | 0.95 | 0.97 |

In the camera lens according to embodiments of the present disclosure, since the first lens L1 has the negative refractive power, the field angle of the camera lens may be effectively increased and the edge of the imaging surface S17 has the sufficient brightness, thereby facilitating the wide angle of the camera lens. Moreover, as shown in the above tables and FIGS. 1 to 40, satisfying the various conditional expressions above allows the camera lens to effectively correct various high-order aberrations, thereby making the distortion less and the relative illumination higher, moreover the camera lens has smaller size while improving the resolution, and can be applied at different work environments.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A camera lens, in sequence from an object side to an image side, comprising:
   a first lens having a negative refractive power, an object-side surface of the first lens being a convex surface;
   a second lens having a refractive power, an object-side surface and an image-side surface of the second lens both being concave surfaces;
   a third lens having a positive refractive power, an image-side surface of the third lens being a concave surface, and an object-side surface of the third lens being a spherical surface;
   a fourth lens having a refractive power;
   a fifth lens having a refractive power;
   a sixth lens having a refractive power; and
   a seventh lens having a refractive power, an object-side surface and an image-side surface of the seventh lens each being an aspheric surface,
   wherein the camera lens satisfies a conditional expression: $-2<f1/f<-1.4$, in which, f1 denotes an effective focal length of the first lens and f denotes an effective focal length of the camera lens.

2. The camera lens according to claim 1, wherein an object-side surface of the third lens is a convex surface.

3. The camera lens according to claim 1, wherein the fourth lens has a positive refractive power, an object-side surface of the fourth lens is a convex surface and an image-side surface of the fourth lens is a convex surface.

4. The camera lens according to claim 1, wherein the camera lens satisfies a conditional expression: $0.5<R5/R7<1$, in which, R5 denotes a radius of curvature of an object-side surface of the third lens, and R7 denotes a radius of curvature of an object-side surface of the fourth lens.

5. The camera lens according to claim 1, wherein the fifth lens has a negative refractive power, an object-side surface of the fifth lens is a convex surface and an image-side surface of the fifth lens is a concave surface, wherein the camera lens satisfies a conditional expression: $-4.1<f5/f<-3.5$, in which, f5 denotes an effective focal length of the fifth lens, and f denotes the effective focal length of the camera lens.

6. The camera lens according to claim 1, wherein the sixth lens has a positive refractive power, an image-side surface of the sixth lens is a convex surface.

7. The camera lens according to claim 1, wherein the camera lens satisfies a conditional expression: $1.7<ImgH/f<2$, in which, ImgH denotes a half of a diagonal line of an effective pixel area on an imaging surface, and f denotes the effective focal length of the camera lens.

8. The camera lens according to claim 1, wherein the camera lens satisfies a conditional expression: $0.18<\Sigma T/TTL<0.45$, in which, $\Sigma T$ denotes a sum of axial spacing distance between any two adjacent lenses of the first lens, the second lens, the third lens, the fourth lens, the fifth lens, the sixth lens and the seventh lens, and TTL denotes an axial distance between an object-side surface of the first lens and an imaging surface.

9. The camera lens according to claim 1, wherein the camera lens satisfies a conditional expression: $0.95<CT2/CT5<1.5$, in which, CT2 denotes a center thickness of the second lens on an optical axis, and CT5 denotes a center thickness of the fifth lens on the optical axis.

10. The camera lens according to claim 1, wherein the camera lens satisfies a conditional expression: $0.18<(CT3+CT6)/TTL<0.5$, in which, CT3 denotes a center thickness of the third lens on an optical axis, CT6 denotes a center thickness of the sixth lens on the optical axis, and TTL denotes an axial distance between an object-side surface of the first lens and an imaging surface.

11. The camera lens according to claim 1, wherein the camera lens satisfies a conditional expression: $-1.6<SAG71/CT7<-1$, in which, SAG71 denotes an axial distance from an intersection point between the object-side surface of the seventh lens and an optical axis to a vertex of an effective radius of an object-side surface of the first lens, and CT7 denotes a center thickness of the seventh lens on the optical axis.

12. The camera lens according to claim 1, wherein the camera lens satisfies a conditional expression: $0.9<DT11/DT72<1.2$, in which, DT11 denotes an effective radius of an object-side surface of the first lens, and DT72 denotes an effective radius of the image-side of the seventh lens.

13. The camera lens according to claim 1, wherein the camera lens satisfies a conditional expression: $0.8 < DT21/DT52 < 1.1$, in which, DT21 denotes an effective radius of an object-side surface of the second lens, and DT52 denotes an effective radius of an image-side surface of the fifth lens.

* * * * *